May 27, 1958

G. B. HALLAHAN 2,836,280

AUTOMATION ORGANIZATION

Filed Feb. 13, 1956

INVENTOR.
Gerald B. Hallahan
BY
John Joseph Roethel
ATTORNEY.

May 27, 1958 G. B. HALLAHAN 2,836,280
AUTOMATION ORGANIZATION

Filed Feb. 13, 1956 12 Sheets-Sheet 6

INVENTOR.
Gerald B. Hallahan
BY
John Joseph Roethel
ATTORNEY.

May 27, 1958 G. B. HALLAHAN 2,836,280
AUTOMATION ORGANIZATION
Filed Feb. 13, 1956 12 Sheets-Sheet 7

INVENTOR.
Gerald B. Hallahan
BY John Joseph Roethel
ATTORNEY.

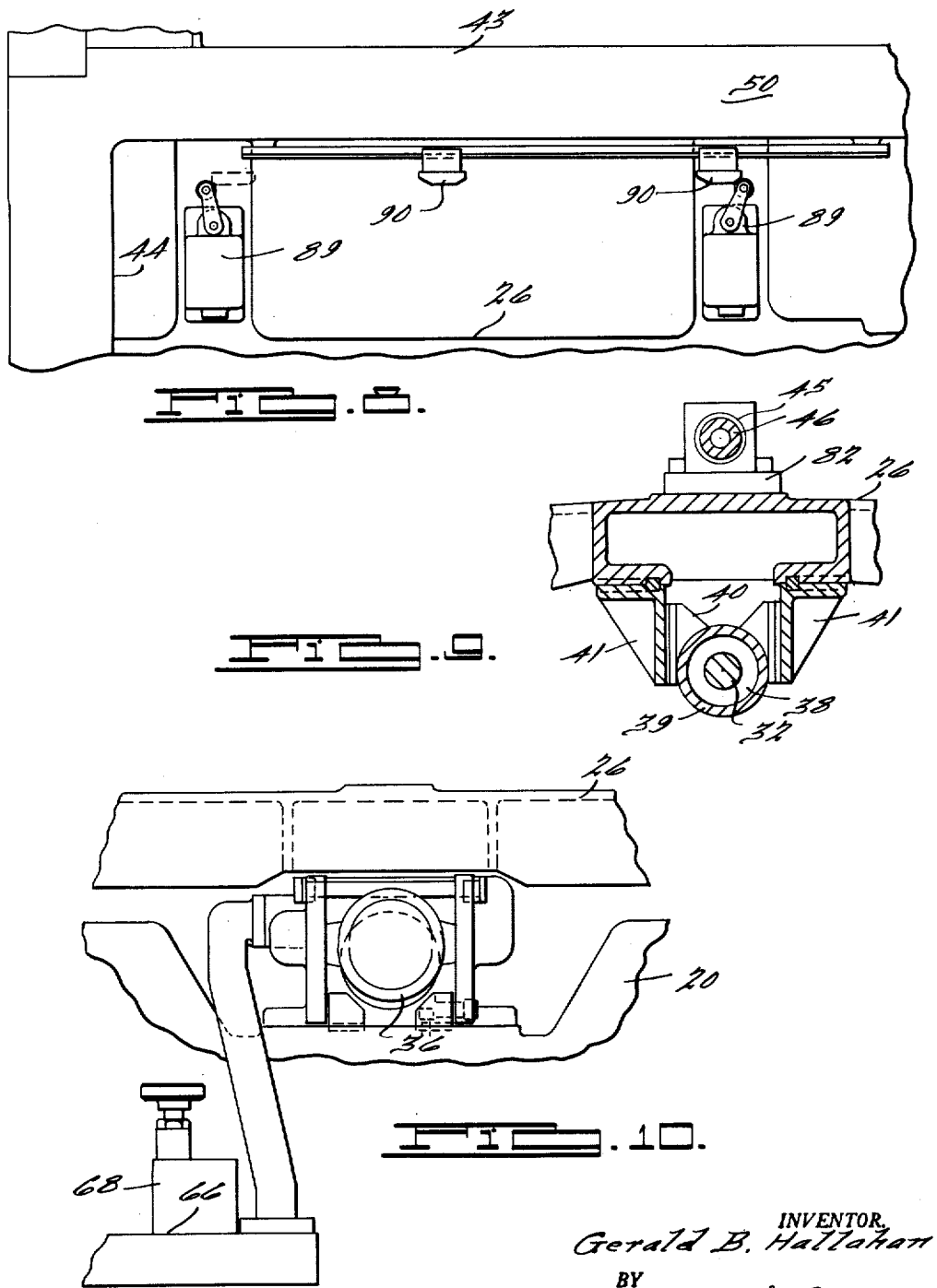

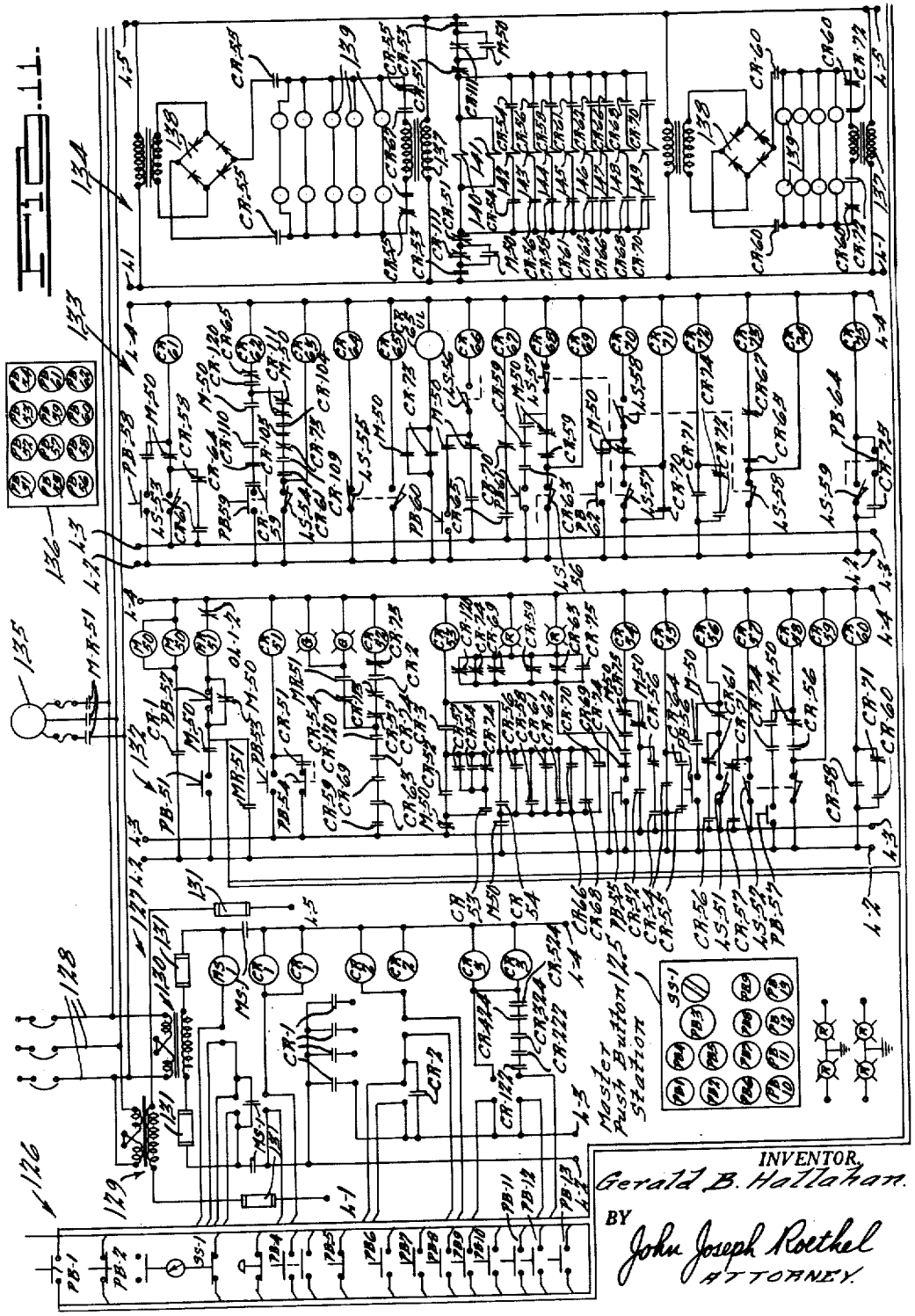

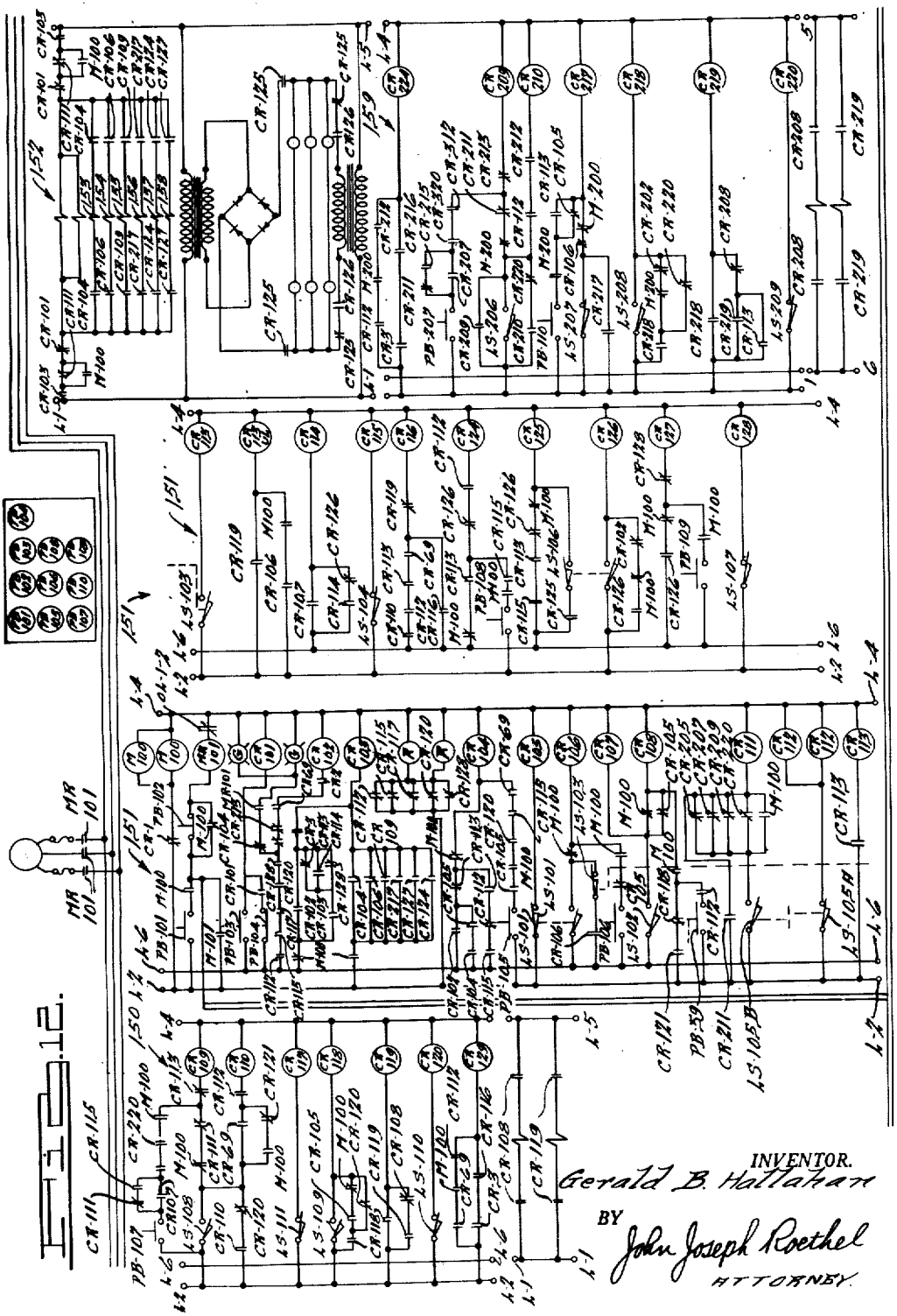

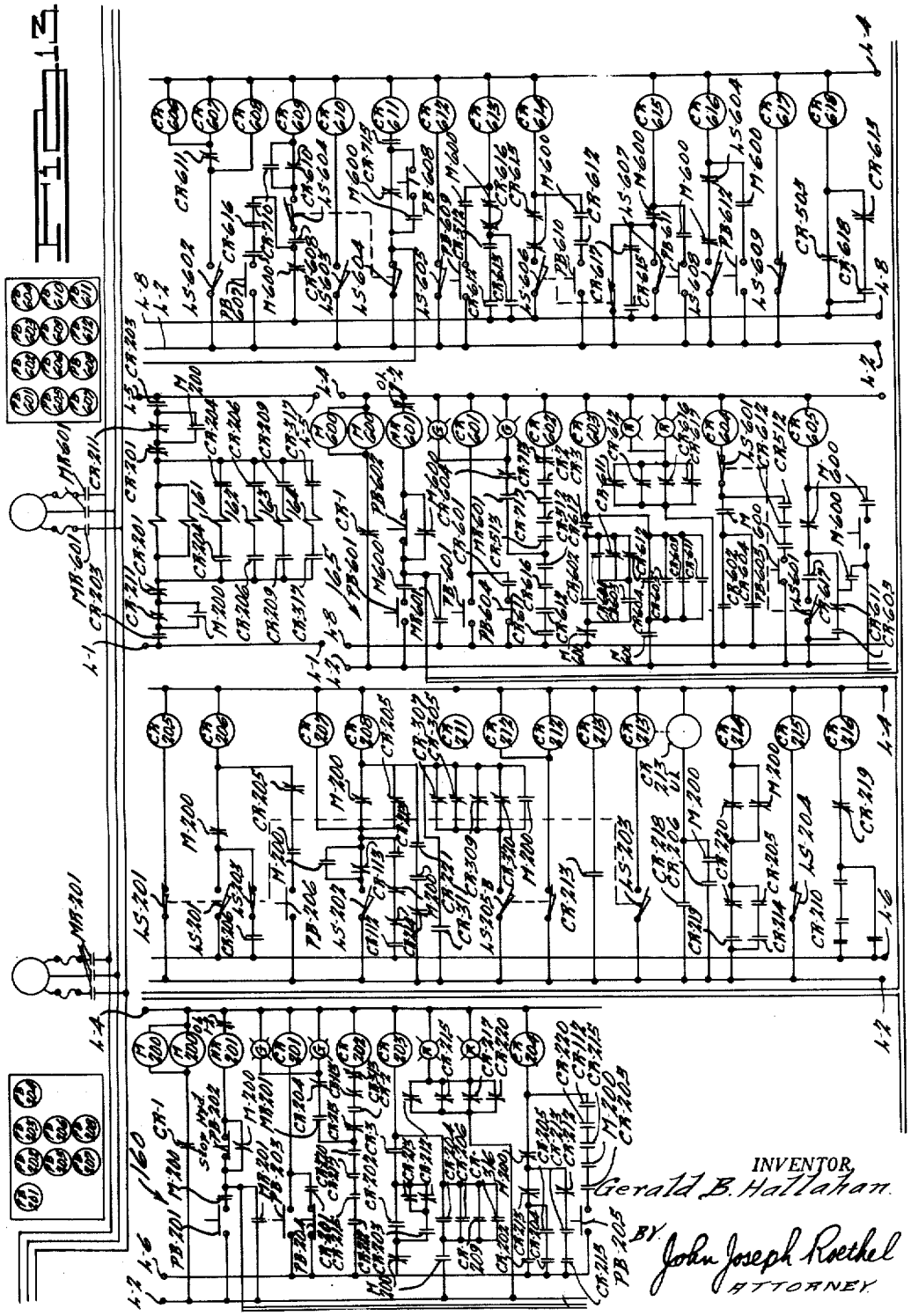

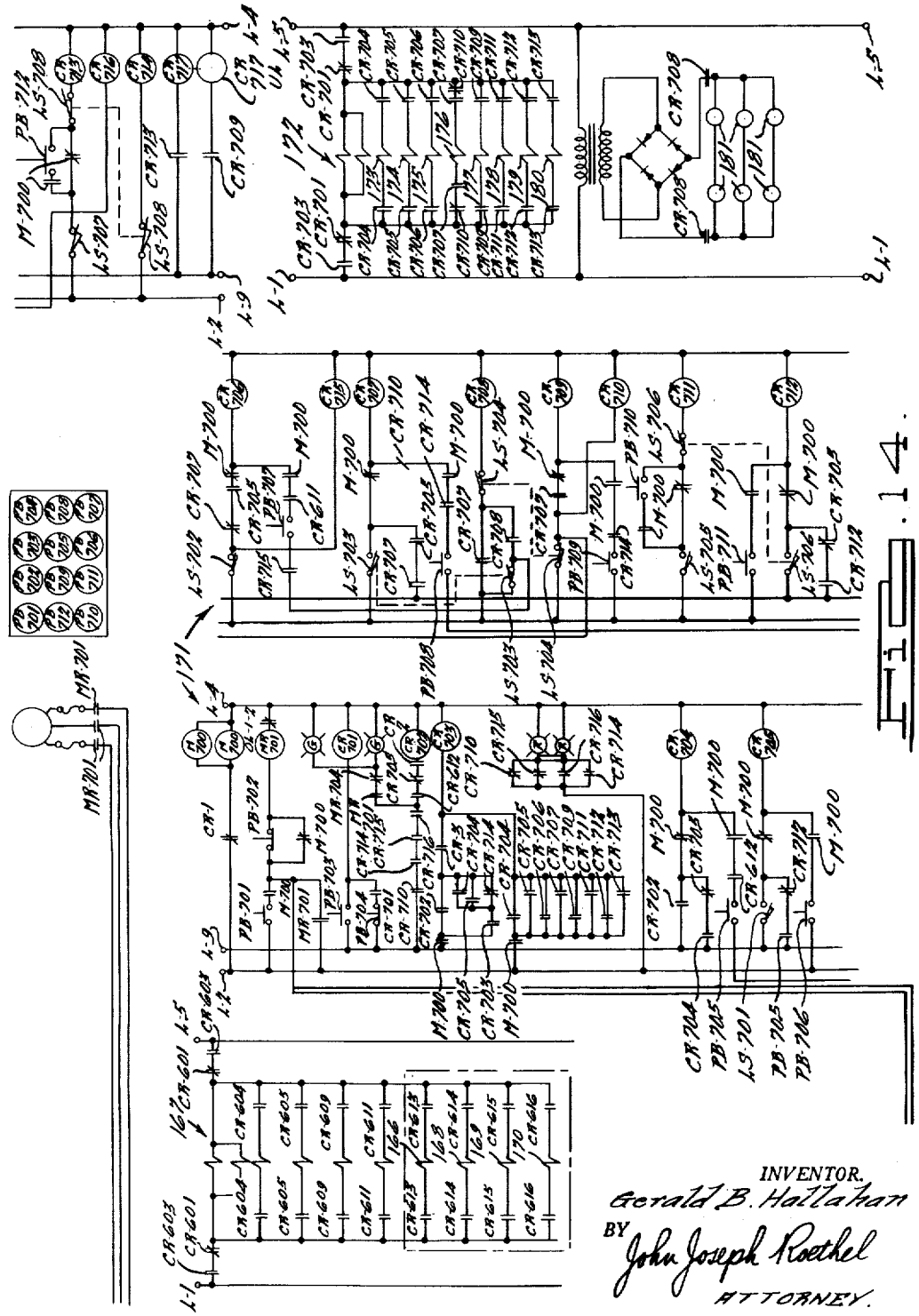

2,836,280

AUTOMATION ORGANIZATION

Gerald B. Hallahan, Southfield Township, Oakland County, Mich., assignor to Modern Engineering Service Co., Berkley, Mich., a corporation of Michigan Application February 13, 1956, Serial No. 565,140

18 Claims. (Cl. 198—19)

This invention relates generally to press working of metals and has particular reference to automation organizations in which a work piece is sequentially transferred along or through a line of machines which are adapted to perform a series of stamping, forming, drawing, piercing, punching or the like operations on said work piece, it being a particular object of the present invention to provide an automation organization in which the least possible time is consumed in loading and unloading the work performing machines.

The key unit in an automation organization is the transfer apparatus for moving the work piece along or through a line of machines adapted to perform the various operation thereon. Therefore, it is a more particular object of the present invention to provide an improved transfer apparatus particularly adapted to handle work pieces on which press working operations are to be or have been performed.

In automation organizations wherein drilling, boring, reaming, and the like operations are performed on machine parts, castings and the like, the machine tool units are generally arranged on opposite sides of a work conveyor and the work pieces are successively transferred or indexed into position relative to the various machine tool units so that the successive operations may be performed. Generally, the conveyor system comprises a track or guideway along which the work piece is pushed or pulled a predetermined distance by a reciprocable propellant element which usually carries a pin, latch, or similar mechanism adapted to engage the work piece on each forward movement from station to station, but which is depressed to move underneath the work piece when the element is retracted. Work pieces of the nature of machine parts, castings, or the like are generally provided with at least one flat surface on which they may slide on the guideway or track, thus making a propellant element of the type briefly described above effective to index the work piece from station to station.

However, in press working of large sheets of metal the work piece blank is generally deformed to such an extent that the only way it can be removed from a die within a press is by a lift and carry motion. In other words, whereas a machine part, casting or the like may be pushed or pulled along a fixed level guideway into position relative to various drilling, reaming, tapping or the like machine units, a work piece, such as a large sheet of metal, which is to be treated to a succession of press operations must be lifted into and out of the various press dies, as well as transported from one press to the next. It is an object of the present invention to provide a transfer apparatus which will efficiently and positively lift and carry work pieces to be press worked from press to press, which will accurately and precisely control the position and attitude of the workpiece during such transfer movements and which will accurately and precisely position the workpiece in the receiving press. It is a further object of the present invention to provide a transfer unit positionable between two presses and so constructed and arranged that one transfer unit will be able to function as a press unloading mechanism for the press on the one side thereof and a press loading mechanism for the press on the other side thereof. It is also an object to provide a basic transfer unit which is flexibly adaptable to other uses as will be more fully developed hereinafter.

The transfer unit embodied in the present invention in its basic form comprises a base or cabinet structure containing or mounting thereon a substantial portion of the electrical control system as well as all of the hydraulic system which, in the illustrated form of the invention, supplies the motivating force for moving the various mechanical elements. The base structure supports a pair of longitudinally extending rails which movably support a carriage member thereon. The carriage member is selectively movable in one direction or the other relative to the base member by means of a lead or actuating screw adapted to be rotated by a hydraulic motor means, said lead screw coacting with a floating ball nut secured to the under side of the carriage member whereby upon rotation of the lead screw the nut will be moved relatively therealong causing movement of the carriage member relatively to the base structure. Supported on the carriage member is a slide member which is selectively held or moved relative to the carriage member by means of an auxiliary hydraulic cylinder mounted on the carriage member and having its piston rod connected to the slide member. A pair of work supporting rails are supported above the carriage and slide members by a linkage system, some of the elements of which are journalled on the carriage member and other elements of which are journalled on the slide member. The linkage system is so constructed and arranged that whenever the slide member is moved relatively to the carriage member by the aforementioned auxiliary hydraulic cylinder, the work supporting rails will be raised or lowered in straight vertical direction, as the case may be, depending upon the relative direction of horizontal movement of the carriage and slide members.

The various mechanical movements obtained during actuation of the transfer units are hydraulically motivated, the base housing an electrically driven main hydraulic pump which supplies fluid under pressure to a manifold. The pressure fluid is distributed in controlled sequence by the manifold to the various parts of the system by pilot operated hydraulic valves.

The operation of the transfer unit may be briefly summarized in terms of work supporting rail movements, it being assumed, for purpose of illustration, that the transfer unit has been positioned between two presses. The rails are adapted to be moved in a rectangular pattern comprising a first movement in a horizontal plane toward the press to be unloaded. This first movement positions the rail ends under the work piece which has been previously lifted from the press die by die lifters. Upon completion of the first movement the rails are lifted vertically to riase the work piece upwardly. This is followed by a horizontal retraction movement to bring the work piece out of the press. Next, the rails are vertically lowered, the work piece being set down on idle station locators supported on the base structure. The movement of the rails in the retraction direction is substantially twice the movement thereof in the initial direction, as will be explained. After the workpiece is unloaded, the rails are next moved in the original horizontal direction back to their original or starting position, completing the rectangular pattern of movement. It will be understood that when the rails are in the initial or starting position, both ends of the rails are clear of the adjacent machine units or presses.

The work piece thus has been unloaded from the first press and deposited in an intermediate or idle station on the transfer unit. The next phase might be to load this work piece in to the second machine unit or press or merely to shift it to yet another intermediate or idle station on the base structure. It will be assumed that a second press is to be loaded. Upon the next movement of the rails toward the first press, which movement is also a movement away from the second press, the rail ends in juxta-position to the second press are positioned beneath the work piece at the transfer unit intermediate or idle station. The rails upon being vertically raised cause the work piece to be lifted from the locators at the intermediate or idle station. This is followed by a horizontal movement wherein the work piece is carried into the second press and a vertical movement wherein the workpiece is then set down on the die lifters or locators. The rails are then again horizontally moved part of the distance toward the first press and thus out of the second press back to their initial or neutral position between the two presses.

In actual operation between two presses, the transfer unit would be actuated to remove a first work piece or panel from the die in the one press, carry the panel to a first intermediate or idle station on the unit, and set the panel down. On the next cycle, the transfer unit would simultaneously raise the first panel from the first intermediate or idle station and a second panel from the first press, such first panel then being carried toward the second press or a second intermediate or idle station and the second panel being carried toward the first idle station. Then the first panel would be unloaded in the second press or on the second intermediate or idle station and the second panel would be unloaded on the first intermediate or idle station. As is required in any automation organization, each movement is electrically controlled and correlated so that it will take place in proper sequence and only when the preceding and following operations have been successfully completed. As long as there is no malfunction in the system and as long as work pieces are fed into the system, the cycle will be repetitive and the work pieces will be moved through the system until the last station is reached.

The various features of the present invention will be explained in detail and other objects and advantages thereof will appear in the following description and appended claims, reference being had to the accompanying drawings forming a part of the specification where like reference characters designate corresponding parts in the several views.

Figs. 1, 2 and 3, when placed end to end, illustrate in perspective an automation organization in accordance with the present invention.

Fig. 8 is an enlarged fragmentary plan view of a portion of Fig. 6 looking in the direction of the arrows 8—8.

Fig. 9 is an enlarged sectional view taken substantially through line 9—9 of Fig. 5.

Fig. 10 is an enlarged fragmentary end elevation of Fig. 4 looking toward the left end thereof.

Figs. 11, 12, 13 and 14 are a diagrammatic representation of a part of the electrical circuits utilized in controlling the automation organization embodying the present invention.

Before explaining in detail the present invention it is to be understood that the invention is not limited in its application to the details of construction or arrangement of parts illustrated in the accompanying drawings, since the invention is capable of other embodiments and of being practiced or carried out in various ways. Also it is to be understood that the phraseology or terminology employed herein is for the purpose of description and not of limitation.

Figure 1:
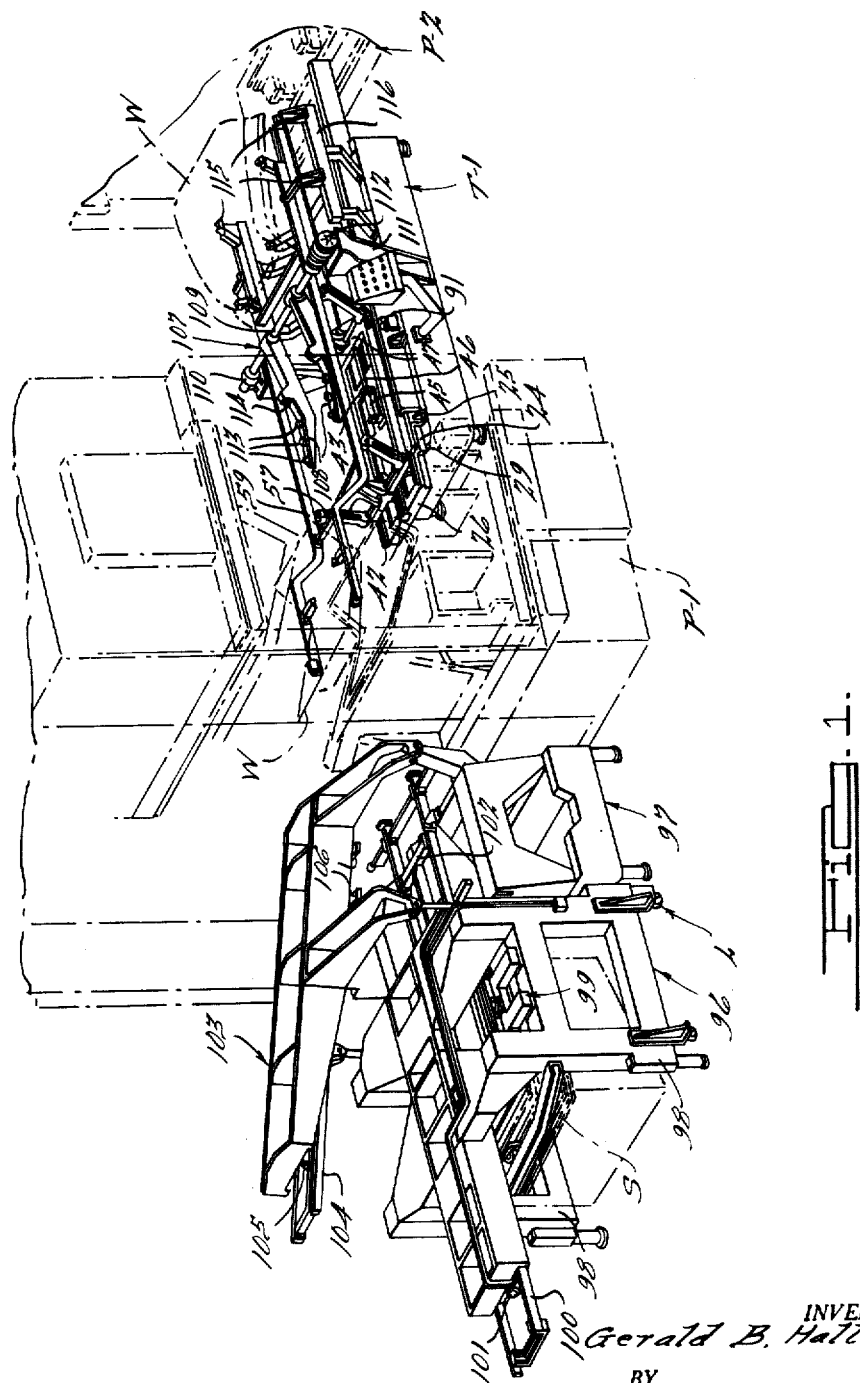
Figure 2:
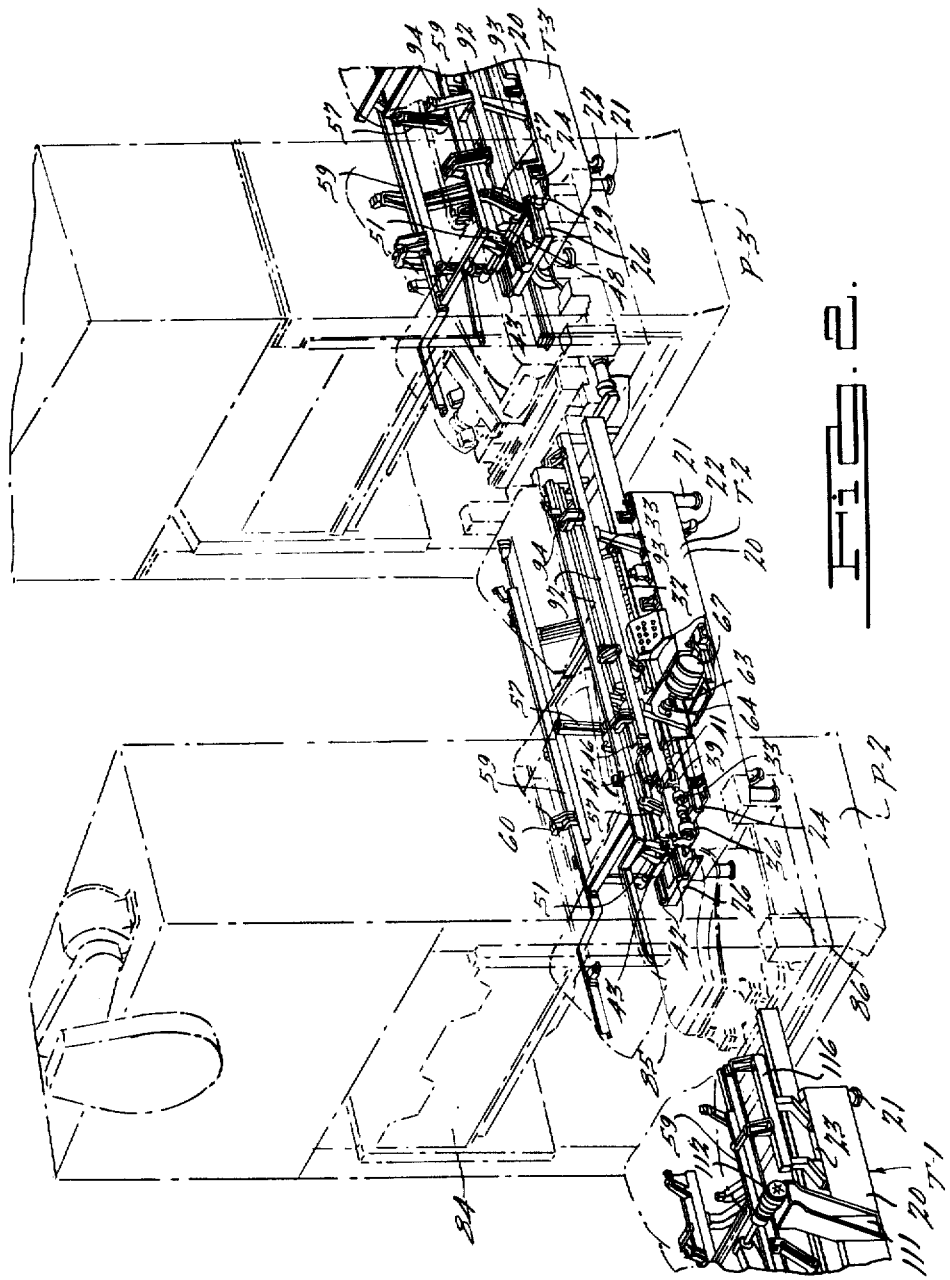
Figure 3:
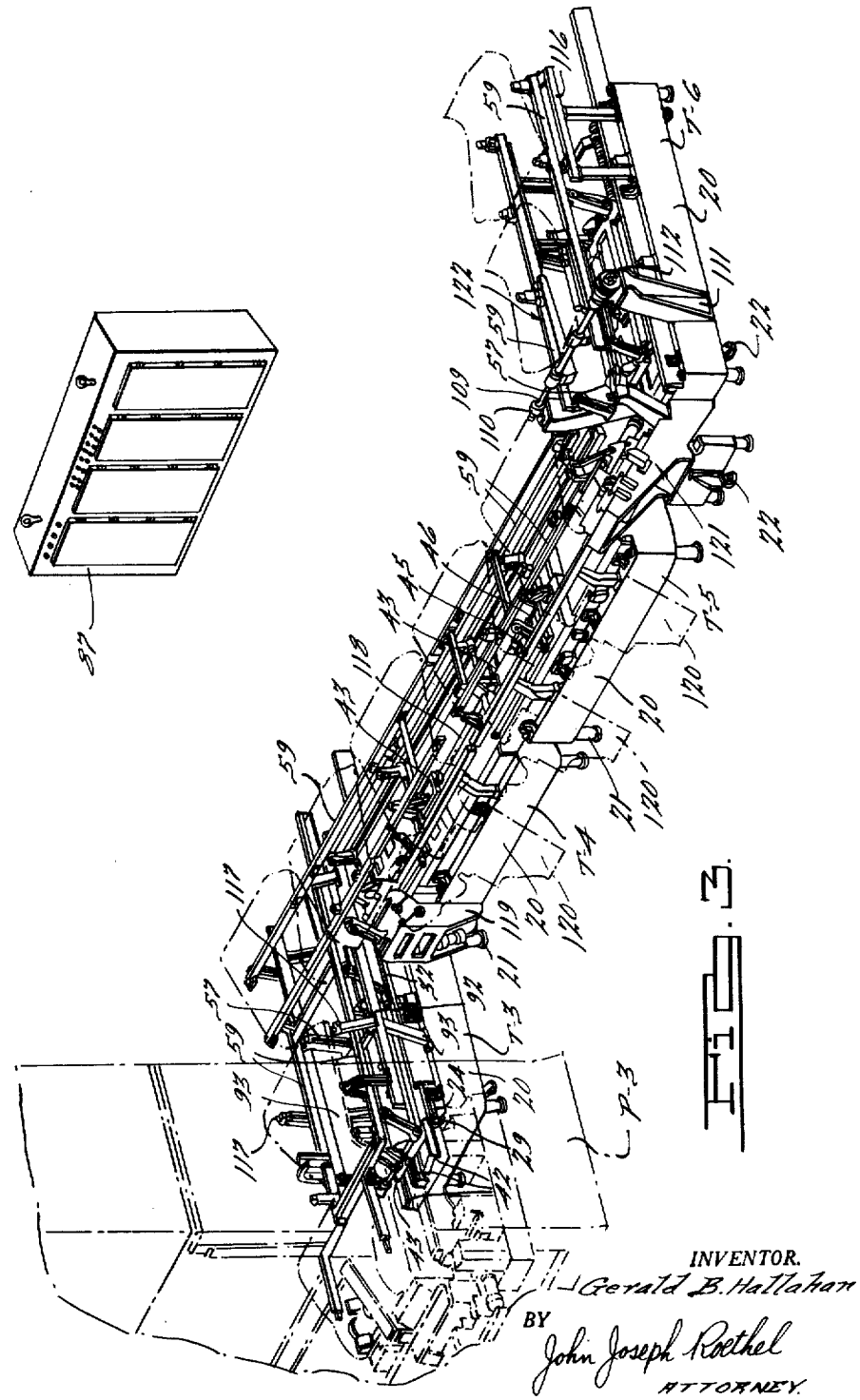

For purposes of illustration, the invention has been shown in the drawings as an automation organization in which a series of operations, principally press working operations, are to be performed on work pieces in a plurality of machines, the machines being arranged in line for a sequence of operations on each work piece. Referring to Figs. 1, 2 and 3 and moving down the production line from left to right, as viewed in the drawings, and illustrated automation organization comprises a loading unit, generally designated L, adapted to load metal sheets S into a press unit P-1, the press unit P-1 and all others hereinafter referred to being shown in dot and dash outline. As will be explained more fully, the loading unit L comprises two independent units, that is, a sheet separator and a sheet feeder. On the unloading side of press unit P-1 is a transfer unit T-1, adapted to transfer the sheet of metal now designated work piece W, from press unit P-1 to press unit P-2. Between the press unit P-2 and a third press unit P-3 is a second transfer unit T-2. A third transfer unit T-3 follows the press unit P-3. As shown in Fig. 3, the transfer unit T-3 loads a fourth transfer unit T-4 located substantially at right angles thereto. The transfer unit T-4 and a second such unit T-5 in line therewith illustrate transfer units adapted to carry work pieces W through a line of secondary machine units which are adapted to perform secondary operations such as punching, piercing and buffing operations, the secondary machine units being shown in dot and dash outline. After going through the secondary operations the work pieces W are deposited on the last transfer unit T-6, where they are in position for additional handling, such as to be loaded into a press welder for the attachment of various structural reinforcing members.

It will be readily understood that although the automation organization illustrated in Figs. 1 to 3 inclusive, has only three press units P shown therein, a greater or lesser number may be used. For example, the work piece W illustrated in the drawings as an exemplary product of the automation organization contemplated by the present invention is an automobile hood panel. The complete forming of the sheet S into the finished hood panel in practice is planned as requiring five press units P instead of the three actually shown. Also, two additional transfer units T would be required to serve the two additional press units P required. The additional press units P and transfer units T would be positioned between transfer unit T-2 and press unit P-3. These additional units have been omitted from the drawings because to show them would involve merely a substantial repetition of the structure of the units such as the transfer unit T-2 and press unit P-2 or P-3.

In an automation organization the key unit may be said to be the transfer unit because the main purpose of automation is to increase productivity by the elimination of the manual handling of the workpiece between opertions thereon. The purpose of the transfer unit is to move a work piece automatically from one machine to the next in controlled sequence. As was stated earlier in the introductory statements regarding the present invention, in automatic press working of work pieces, and particularly in the press working of large panels utilized in automotive vehicle manufacture, it is not possible to merely drag the panel from one press machine unit to the next. To do so would result in damage to the panel contour resulting in either the rejection of the panel or requiring expensive refinishing operations to repair the damage. It is essential that a lift and carry operation be employed, which operation in the past was either manually accomplished or accomplished with the aid of mechanical devices manually guided and controlled. The transfer unit, generally designated T–2, and shown in perspective in Fig. 2, may be considered representative of a transfer unit embodying the principles of the present invention. The unit is illustrated in detail in Figs. 4 to 10 inclusive.

Figure 4:
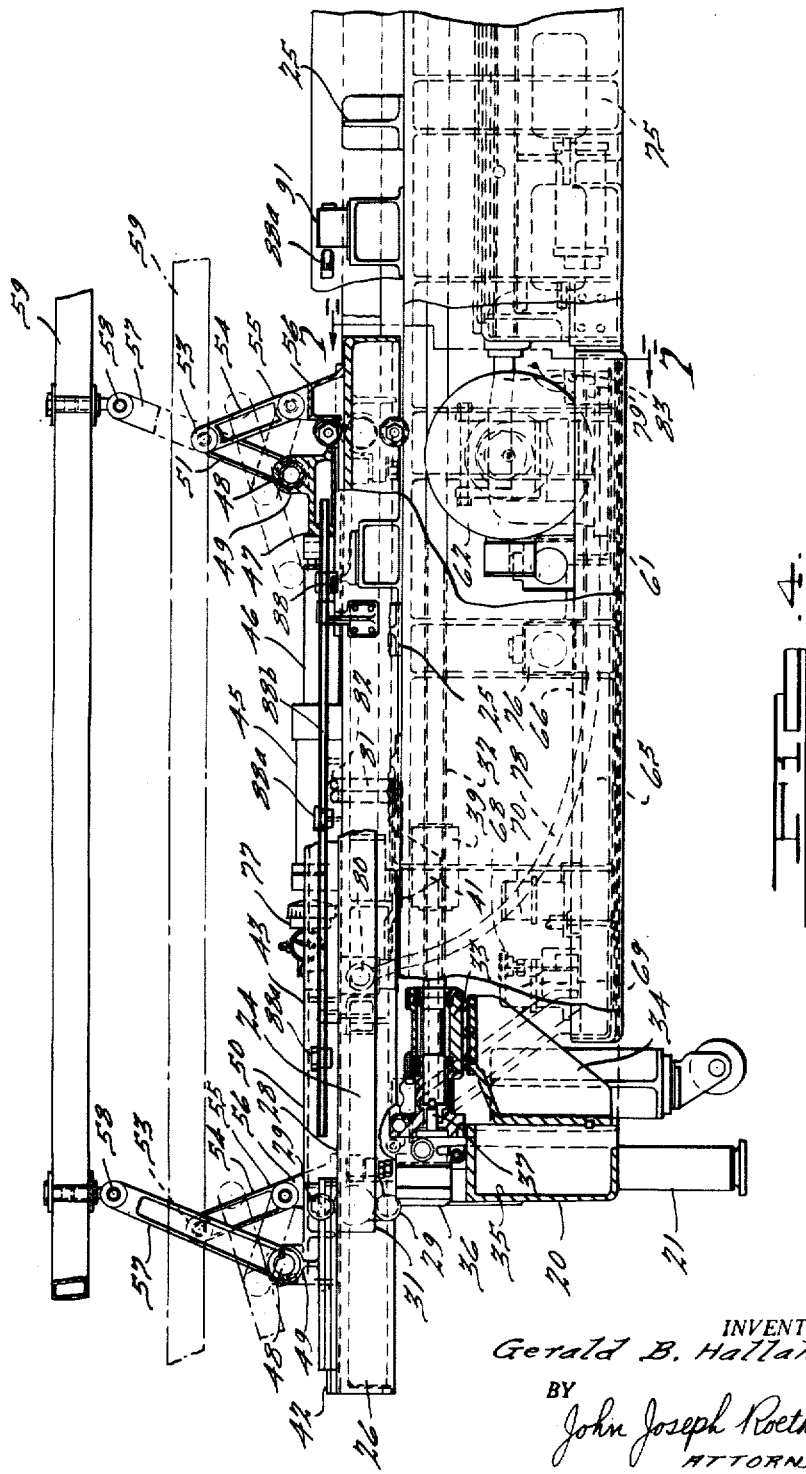
Fig. 4 is a fragmentary side elevation in part sectional of the basic transfer unit embodying the present invention.

Referring to Figs. 2 and 4, the transfer unit T–2 is illustrated as comprising a base structure 20 having adjustable legs or corner posts 21 on which the unit is adapted to rest when in operative position relative to a press unit P. The base 20 is provided with retractable caster devices 22 on which the unit may be moved from place to place as desired. As shown in the drawings the base is substantially rectangular in shape with its longitudinal axis projecting in the direction of the two presses between which the unit is shown located. The base structure is hollow and houses or supports all of the major components of the hydraulic system used to motivate the transfer mechanism, as will be more fully explained.

Mounted on the upper surface 23 of the base structure are a pair of spaced longitudinally extending guide ways 24. The guide ways 24 are preferably tubular and are of a rectangular cross section. They are mounted on the base surface by brackets 25 of suitable configuration, the brackets 25 being secured to the guide ways 24 and to the base surface 23 by conventional fastening means. The guide ways 24 movably support a longitudinally extending carriage member 26 therebetween. The carriage member 26 is illustrated as being about half as long as the base structure 20 and the upper surface 27 thereof is about on a level with the upper surface 28 of the guide ways 24. The carriage member 26 is supported for movement on the guide ways 24 by pairs of rollers 29 at each of the four corners thereof. That is, at each corner the carriage member 26 has secured thereto a bracket member 30 on which are journaled an upper and lower vertically spaced roller 29, each upper roller 29 riding on the upper surface 28 of the guide way 24 and each lower roller 29 being engaged with the lower surface 31 of the guide way 24. It will be readily apparent that the lower rollers 29 will function to prevent any upward vertical displacement or movement of either end of the carriage member 26 should a tilting force be exerted outwardly of the other end thereof, as might occur during the operation of the transfer unit.

The carriage member 26 is moved along the guide ways 24 and therefore relatively to the base 20 by means of a lead or actuating screw 32. The lead screw 32 is rotatably supported at each end thereof in bearing housings 33 which are supported on brackets 34 suitably secured to the wall structure of the base 20. The left bearing housing 33, the one visible in Fig. 4, at the left end thereof, is somewhat inboard of the left end wall 35 of the base to provide room for a hydraulic motor 36 and the coupling unit 37 connecting the hydraulic motor to the lead screw 32. The lead screw 32 is operatively associated with the carriage member 26 by means of a floating ball nut 38 carried within a housing 39. As best seen, in Fig. 9, the ball nut housing 39 is supported by a member 40 keyed to brackets 41 suspended from the under side of the carriage 26. The construction and arrangement of the member 40 is such that it is held against movement relative to the carriage 26 longitudinally thereof but is permitted to float up and down and laterally to prevent the ball nut from any occasion to bind on the lead screw 32. The ball nut housing 39 being carried by the carriage 26 in this manner will cause the latter to be moved along the track members 24 as the nut 38 traverses the lead screw 32.

On its upper surface 27 the carriage member 26 is provided with three longitudinally extending key guides 42. One of the key guides 42 is substantially centrally located on the carriage member 26 and the other two are positioned one on each side thereof. The key guides 42 slideably support a slide member 43, which is somewhat shorter in length than the carriage member 26. The slide member 43 is a rectangular framework structure having an open center section 44. The open center section 44 provides clearance for a hydraulic cylinder 45 which is mounted on top of the carriage member 26. The piston rod 46 of the hydraulic cylinder 45 is connected at the right end thereof, as viewed in Fig. 5, to the right end frame member 47 of the slideable member 43. The hydraulic cylinder 45 serves two purposes. First, it acts as a locking or retaining device to hold the slide member 43 relative to the carriage member 26 during movement of the carriage member by the lead screw 32 mechanism. Secondly, the hydraulic cylinder 45 functions to move the slide member 43 relative to the carriage member 26 in a predetermined time sequence. This movement of the slide member 43 relative to the carriage member 26 performs an important function in the operation of the transfer unit, as now will be explained.

It will be noted that the slide member 43 is provided with a laterally extending shaft 48 at each end thereof. Each shaft 48 is suitably journalled on bosses 49 extending upwardly from the upper surface 50 and at the four corners of the slide member 43. Each shaft 48 is provided at the center thereof with a substantially upwardly extending bell crank arm 51. Each bell crank arm 51 is pivotally connected at its upper end 52 to the upper end 53 of a link 54, the lower end 55 of each link being pivotally journalled on a boss 56 extending upwardly from the upper surface 27 of the carriage member 26. At the ends thereof each shaft 48 is provided with a substantially upwardly extending arm 57 which is twice the length of the bell crank arm 51. The bell crank arm 51 is equal in length to the link 54. The resulting linkage arrangement provides what is known as a Scott-Russel straight line motion mechanism. In other words, the point 58 on the upper end of each upwardly extending arm 57 moves in a straight vertical motion every time the slide member 43 is moved relatively to the carriage member 26 by the hydraulic cylinder 45. Pivotally clamped to the upper ends of the arm 557 are a pair of longitudinally extending work transfer rails 59. As shown in Fig. 2, the transfer rails 59 extend a substantial distance over the ends of the base unit 20. Suitable locating devices 60 are spaced on the transfer rails 59 to provide accurate means for positioning the work pieces W thereon during the transfer motion as will be more fully explained.

Figure 7:
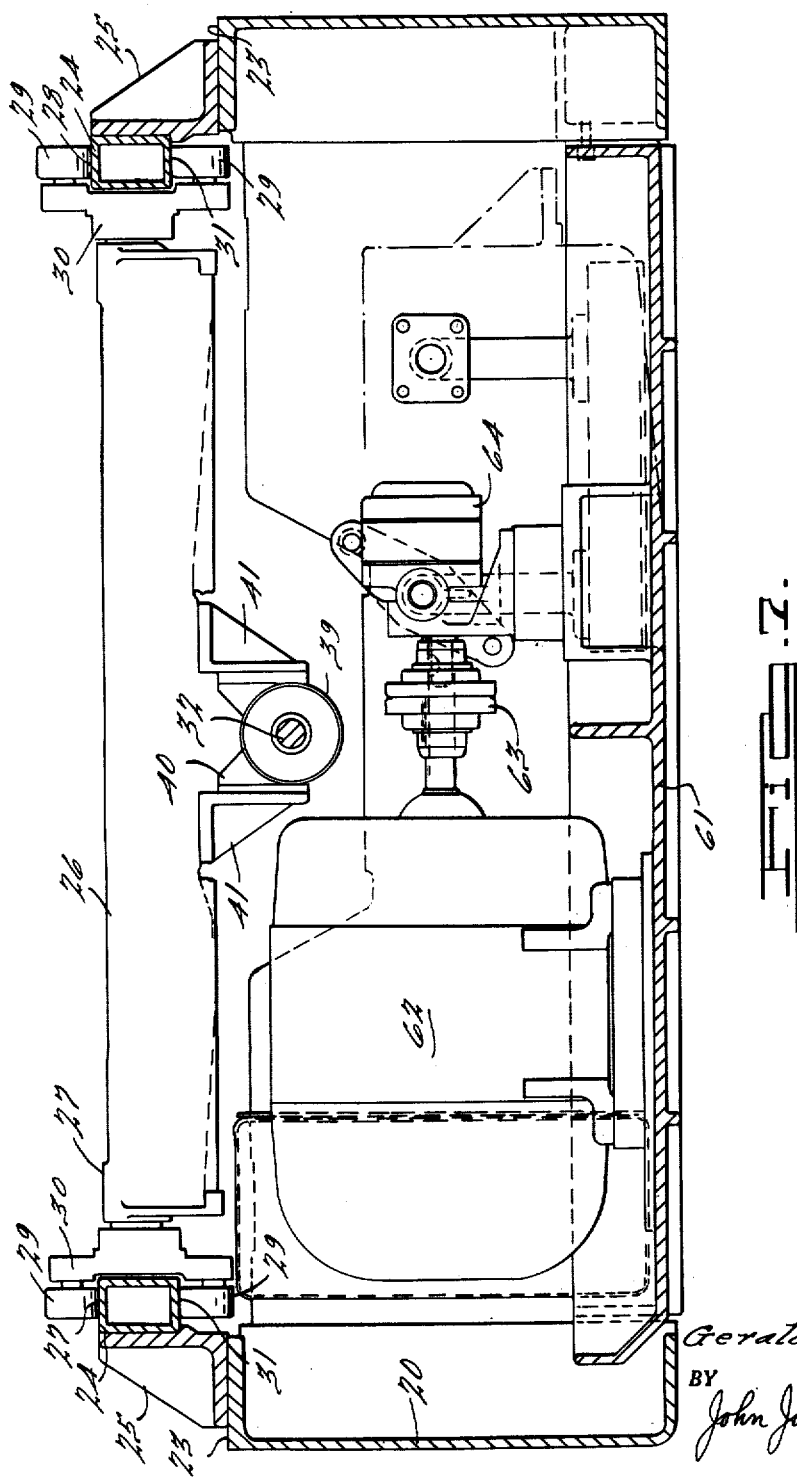
Fig. 7 is a view in part sectional taken substantially through line 7—7 of Fig. 4, looking in the direction of the arrows.

Referring to Fig. 7, it will be noted that the base unit 20 is provided with a suitable cradle or pan 61 carrying an electric motor 62 coupled by a suitable coupling device 63 to a hydraulic pump 64. The hydraulic pump 64 is the main pump unit of the transfer device. The pump unit 64 discharges fluid to a manifold 65, best seen in Fig. 5.

The upper surface 66 of the manifold 65 is an accurately machined flat surface adapted to receive a number of pilot operated solenoid valves, generally designated 67, and a number of related flow control valves 68.

In the illustrated embodiment being described, the valve system appears in Fig. 5 as follows: Solenoid valve 69 mounted on the valve receiving surface 66 of the manifold 65 controls the carriage 26 movements along the guide ways 24. That is, the valve 69 controls the flow of fluid to the hydraulic motor 36 which drives the lead screw 32 in one direction or the other. A second solenoid valve 70 controls the motivation of the left mechanism. The valve 70 controls the flow of fluid to hydraulic cylinder 45 which is operative to cause the slide member 43 to move relatively to the carriage member 26, thereby causing the Scott-Russel linkage system to raise or lower, as the case may be, the work transfer rails 59. Additional solenoid valves 71 and 72 may be provided for controlling the motivation of other mechanisms, as will be more fully explained. Also shown mounted on the valve receiving surface 66 of the manifold 65 is a vent valve 73 having the function of maintaining the system pressure. A by-pass valve 74 is also shown. This valve 74 is a two way valve adapted to bypass the fluid coming from the main hydraulic pump 64 directly back to the tank 75. Provision is made for the mounting of additional service units on the manifold, such as filters 76 for filtering the oil coming from the hydraulic pump 64.

Figure 5:
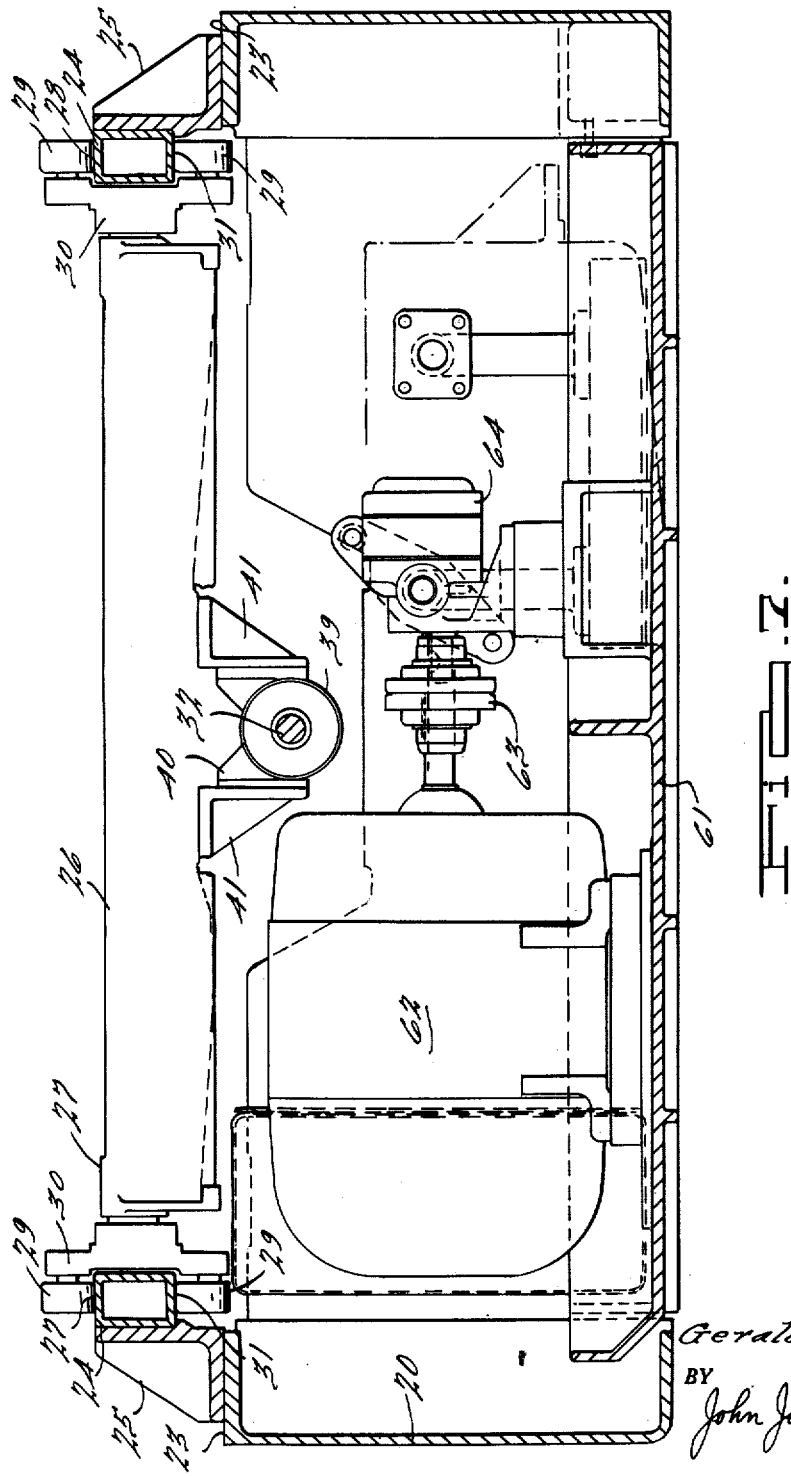
Fig. 5 is a plan view corresponding to Fig. 4.
Figure 6:
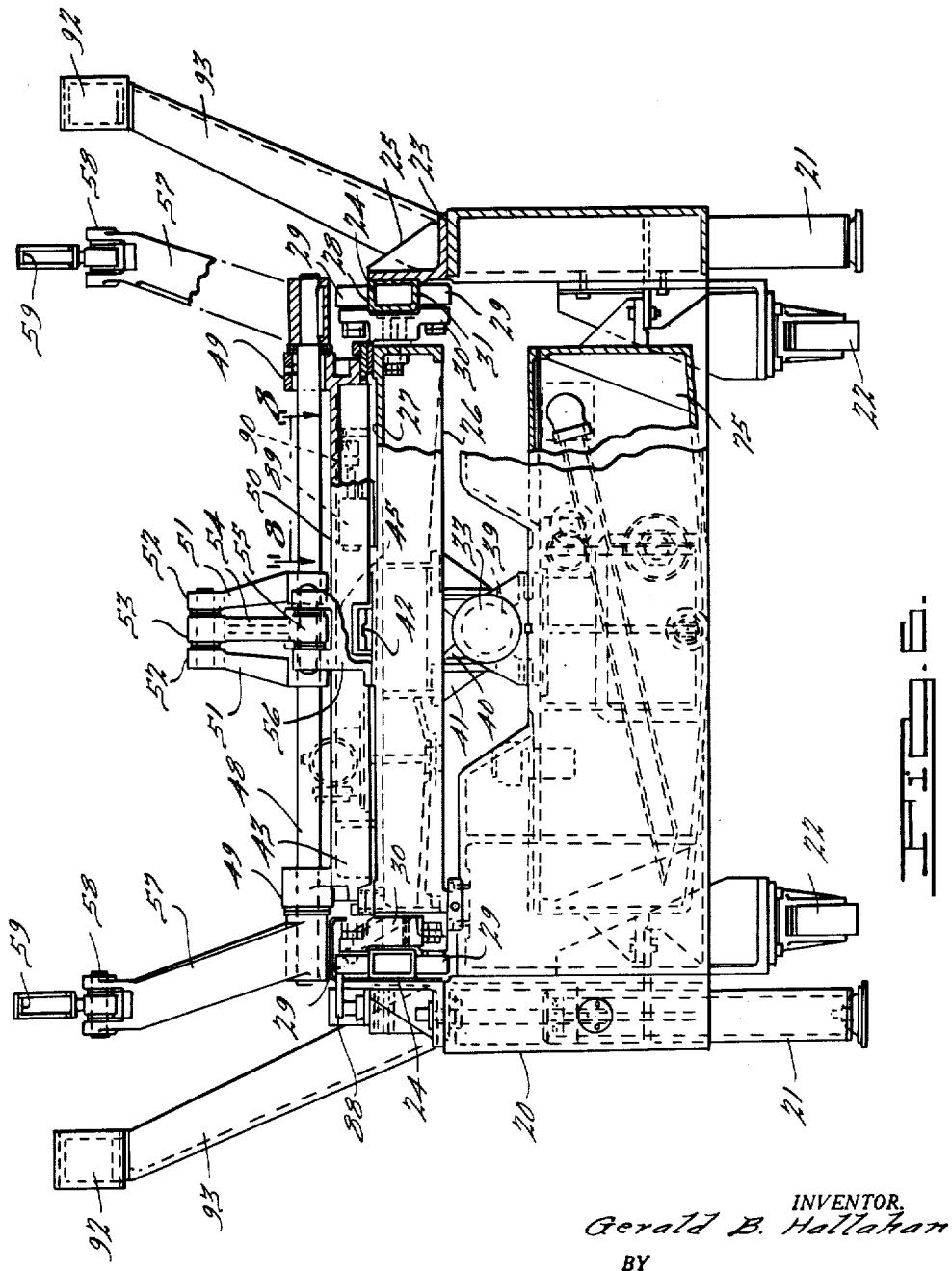
Fig. 6 is an end elevation of the transfer unit as would be seen when looking at the right end of the unit as viewed in Fig. 4.

The transfer unit may also be provided with a mist lubricating system, the control unit 77 for which is shown in Figs. 4 and 5. The mist lubricating system would deliver oil in mist form under pressure to the various moving parts, such as the Scott-Russel linkage elements.

It should be mentioned at this point that with one exception the flow of hydraulic fluid from pump 64 through manifold 65 to the various operating units is through fixed fluid passageways which are either cored through the body portions of the various structures or comprise rigid hydraulic tubing members. Only the auxiliary hydraulic cylinder 45 is supplied through a fluid flow circuit which includes flexible tubing. This is necessary because the cylinder 45 is mounted on the carriage 26, the latter being movable relative to the base 20. As illustrated in Figs. 4 and 5, flexible tubing 78 is provided between a swivel coupling 79 mounted on the cradle or pan 61 and a second swivel coupling 80 mounted on the carriage 26. The swivel couplings 79 and 80 permit the hose 78 to swing over as the upper coupling 80 passes over the lower coupling 79 during movement of the carriage 26 back and forth over the base. The upper swivel coupling 80 is operatively connected through suitable manifolding 81 to the auxiliary cylinder mounting manifold 82 mounted on the carriage 26. The lower swivel coupling 79 is also operatively connected by suitable rigid tubing 83 to the manifold 65.

In operation, the T–2 transfer unit functions substantially as follows:

It will be assumed that the P–2 press ram 84 has just completed an operational stroke and has returned to its uppermost position in the press. Further, it will be assumed that the die lifters have lifted the work piece or panel W–1 off the portion 85 of the die attached to the bed 86 of the press P–2. The work piece or panel W–1 is thus ready to be lifted from the press P–2 and the fact that it is ready for such movement is signalled by suitable limit switches (not shown) to a master relay control panel 87. It will be understood that the pump motor 62 is in continuous operation so that the main hydraulic pump 64 is continually pumping fluid under pressure to the manifold 65. All that is required to set the transfer unit T–2 into operation is the proper impulse to the master control panel 87 such as the impulse resulting from the signal from the press that the panel is ready for removal. This would result in solenoid valve 69 opening a hydraulic circuit from the manifold to the hydraulic motor 36 whereby the motor will be driven to cause the actuating screw 32 to be rotated in a direction to cause the nut 37 to move toward the left as viewed in Fig. 4. Movement of the nut 37 in this direction results in the carriage member 26, the slide member 43 mounted thereon and the work supporting or transfer rails 59, which are partly supported on the carriage member 26 and partly on the slide member 43, all being bodily shifted to the left toward the P–2 press. The completion of the movement of the carriage member 26 to the left is determined by a pre-positioned limit switch 88 which, when the carriage member reaches a pre-determined position, is actuatable by a trip element 88a carried on a rail 88b. Switch 88 is actuated to send an impulse to a master relay panel which is effective to actuate the solenoid valve 69 to shut off the flow of fluid to the hydraulic motor 36 thereby stopping rotation of the actuating screw 32. At the completion of the travel of carriage 26, the solenoid valve 70 is actuated to permit fluid under pressure to be supplied to the hydraulic cylinder piston 46 in a direction effective to cause the slide member 43 to be moved to the right, as viewed in Fig. 4, relatively to the carriage member 26. Through the linkage system supporting the rails 59 the latter will be moved vertically upwardly. The work piece or panel W–1 will be lifted vertically upwardly off the die lifters. The locators 60 which have been precisely pre-positioned on the work transfer rails are utilized to position the workpiece W–1 on the rails while being lifted and carried. Upon the rails 59 reaching a pre-determined position in their upward movement, a limit switch 89, see Fig. 8, is actuated and through appropriate electrical circuits the solenoid valve 70 is closed. The flow of fluid through the hydraulic circuit leading to the hydraulic cylinder 45 is thus cut-off causing the cessation of the movement of the slide member 43 on the carriage member 26. The limit switch 89 is mounted so as to lie in the path of a trip element 90 carried by the slide member 43, it being understood that the vertical movement of the work transfer rails 59 is proportional to the horizontal movement of the slide member 43.

The closing of the solenoid valve 70 upon the completion of the lifting movement of the work transfer rails 59 is sequentially followed by the re-opening of the solenoid valve 69. This time valve 69 directs the fluid through a circuit to the hydraulic motor 36 so as to cause the same to rotate the actuating screw 32 in a direction opposite to that in which it was first rotated thereby causing the carriage member 26 and the slide member 43 and rails 59 thereon to be bodily shifted to the right, as viewed in Figs. 2 and 4, away from the press P–2. However, the movement of the carriage member 26 to the right is substantially twice the distance of its first movement to the left, although such movement might be interrupted. The interruption would occur if the P–3 press were not ready to receive a workpiece. As the carriage member 26 moves to the right a trip element 88a thereon may encounter a conveniently positioned limit switch 91 which is termed a neutral switch. The neutral switch 91 is effective to neutralize movement of the carriage member 26 to the right until the P–3 press be ready to receive a workpiece W–1 when the carriage member 26 starts its movement to the right, such movement will be permitted to continue without interruption.

The workpiece W–1 which has just been removed from the press P–2 is not immediately fed into press P–3. For reasons which will become apparent as the description proceeds, the transfer units are provided with intermediate or idle positions at which the workpieces W are temporarily deposited. It will be noted that the exemplary transfer unit T–2 being described is provided with two parallel longitudinally extending rails 92 supported on upwardly extending arms 93. The rails 92 are provided with locators 94 adapted to receive the workpieces W and to position the same at rest.

The workpiece W–1 which has just been removed from press P–2 is at the termination of the movement of the carriage member 26 to the right now poised above the set of locators 94 on the rails 92. The work transfer rails 59 are lowered—again by movement of the slide member 43 relative to the carriage member 26. In terms of solenoid valve actuation, solenoid valve 69 is closed after the termination of the movement of the carriage member 26 to the right and solenoid valve 70 is open to permit flow of fluid from the manifold 65 to hydraulic cylinder 45. Upon limit switch 89 being actuated by trip element 90 carried by the slide member 43, thus signifying that the work transfer rails 59 have been fully lowered and that the workpiece W–1 is now resting on the locators 94, solenoid valve 70 again closes and valve 69 again reopens. The hydraulic motor 36 is motivated to cause such rotation of the screw 32 as will cause the carriage member 26 to return to its original position, the work transfer rails 59 being clear of interference with both presses P–2 and P–3.

The next cycle of movements of the work transfer rails 59 will result in locators 60 carried by said rails being positioned under the workpiece W–1. The workpiece W–1 will be raised upwardly, carried toward the right end of the transfer unit T–2, and will be set down on locators 94 carried by the fixed or idle station rails 92. Thus, in two cycles of movement, the workpiece W–1 has been moved from the P–2 press to a rest station at the right end of the transfer unit T–2. On the next or third cycle of movements of the work transfer rails 59, locators 60 on the left end thereof will engage the workpiece W–2 to position and balance the same while it is raised from the fixed rails 92, carried into press P–3 and set down therein.

The foregoing description has explained in detail the features of an exemplary transfer unit T–2 constructed in accordance with the principles of the present invention. It will be understood that the basic transfer unit, such as the unit T–2, is subject to various structural modification in order to enable it to take its place in an automation organization. In Figs. 1, 2 and 3 there is illustrated an exemplary automation organization showing the basic transfer unit T–2 and various modifications thereof which will now be explained.

Shown to the left of the press P–1 as viewed in Fig. 1 is a material handling structure, generally designated L. The materially handling structure L comprises two independent or separable units, generally designated 96 and 97. The unit 96 is a sheet stock separator and the unit 97 is a sheet feeder unit for loading a single sheet at a time into the first press P–1. A stack of metal blanks or sheets S are placed between the frame members 98 of the sheet separator where they are supported on any suitable elevating and levelling means (not shown). The separator unit 96 contains within its base frame members 98 a magnetic sheet floater device, generally designated 99. The magnetic sheet floater 99 utilizes the principle of magnetic induction to put a like electrostatic charge on each sheet. The sheets S are thereby repelled from one another, become separated and actually float between the frame members 98.

On the underside of a travelling frame member 100, electromagnets (not visible) are effective to pick up the top sheet S from the floating sheets. The sliding frame member is then hydraulically shifted by a fluid motor lead screw mechanism 101 to carry the sheet S to the right and to position it on a receiving table or framework 102. The travelling frame member 100 is then retracted.

The receiving table or framework 102 is a part of the unit 97 designated the sheet feeder. Because of the nature of the die in the press P–1, it is necessary that the sheet S be fed thereinto at an angle. Accordingly, the sheet feeder unit 97 has mounted thereon an angularly inclined superstructure 103. The superstructure 103 carries on the underside thereof a slidable frame member 104 which is shiftable relatively thereto by a fluid motor lead screw mechanism 105. The frame member carries on the underside thereof special flux adapters or electromagnet members 106.

In operation, after a sheet of metal S has been deposited on the receiving table 102 the latter swings upwardly until the sheet S contacts the electromagnets 106. The frame member 104 is then moved to the right, as viewed in Fig. 1, to transport the sheet S into the die of press P–1. After the release of the sheet S, the frame member 104 is retracted.

It will be understood that the sheet stock separator 96 and the sheet feeder unit 97 are each provided with suitable electrical and hydraulic circuits controlled by the necessary limit switches, relays, solenoid valves and the like to properly correlate the movements of the various parts thereof in timed and controlled sequence, particularly so that the feeder unit 97 is not attempting to load a sheet S into a press before the press is ready to receive it.

It will be noted that the transfer unit T–1 following the press P–1 has a noticeable difference in appearance over the transfer unit T–2 which was described as exemplifying the transfer units T embodied in the present invention.

The transfer unit T–1 in addition to being constructed and arranged to move a workpiece or panel W from the P–1 press to the P–2 press also has the function of inverting the workpiece or panel W. It will be noted that the workpiece or panel W being lifted from the press P–1 has its concave side up whereas the workpiece or panel W on the end of the transfer unit T–1 in readiness to be transported into the P–2 press has its convex side up. Intermediate the ends thereof the transfer unit T–2 is provided with a turnover mechanism, generally designated 107.

The turnover mechanism 107 comprises a pair of spaced swingable arms 108 secured to a shaft 109. The shaft 109 is journalled at each end thereof in bearing housings 110 carried on support pedestals 111 secured to the transfer unit base structure 20. In the illustrated embodiment the shaft 109 is swung through a half circle by a hydro-motor unit 112. The turnover mechanism arms 108 are provided with electro-magnetic buttons 113 and locators 114 for retaining and locating the workpiece or panel W thereon during the turnover motion.

In operation, the T–1 transfer unit transfer rails 59 are effective to lift a workpiece or panel W from the press P–1, to carry such workpiece W to the swingable arms 108 and to set the same down in proper relationship and position on the buttons 113 and in alignment with the locators 114. In proper sequence the turnover mechanism 107, under control of a solenoid valve 71 mounted on the valve mounting surface 66 over the manifold 65 will carry the panel through an arc of 180 degrees and set the latter down on locators 115 carried by fixed rails 116. Here the workpiece or panel W is ready to be picked up on the next cyclical movement of the work transfer rails 59 for loading into the press P–2.

Thus far in the foregoing description the following machine units of the abbreviated automation organization illustrated in Figs. 1 to 3 inclusive have been touched upon in more or less detail and also not necessarily in the order of their appearance in the automation line: The loading mechanism, generally designated L; the press unit P–1; the transfer unit T–1 embodying the turnover mechanism; the press unit P–2; the transfer unit T–2, which has been considered the exemplary unit and has been described in detail; and the press unit P–3.

To the right of the press unit P–3, as viewed in Fig. 3, is placed a transfer unit T–3 which is substantially similar to the transfer unit T–2. It differs therefrom only in the construction of the locators 117 on the fixed rails 92, said locators on this unit extending upwardly somewhat higher than the corresponding locators on the T–2 transfer unit. The reason for this is that the automation line makes a turn at the end of the T–3 transfer unit. Prior to this point the workpieces or panels W have been moved through the presses in the direction of their longitudinal axis. In order to make the front end of each workpiece or panel W accessible for certain operations to be performed, it is necessary that they be moved at a direction at right angles to their original direction of movement.

It will be noted that the base of the transfer unit T–4 following the transfer unit T–3 is at right angles to the latter. The transfer unit T–4 is followed by a transfer unit T–5 in longitudinal alignment therewith. The transfer units T–4 and T–5 may be and are illustrated as being hooked up for tandem operation. For example, it will be noted that the slide member 43 of the T–4 transfer unit is connected by a tie or connecting rod 118 to the slide member 43 of the T–5 transfer unit. The carriage members 26 may likewise be coupled together thus requiring only one power unit for moving the carriage members 26 and slide members 43 back and forth.

The operations to be performed on the front of each panel W in the illustrated automation organization are certain piercing operations and buffing operations. For example, at the left end of the transfer unit T–4, as viewed in Fig. 4, there is shown a piercing unit, generally designated 119. Other units, shown in dotted outline and generally designated 120, may be positioned to perform other piercing, buffing or any other desired operations. In all cases the transfer rails 59 follow the same cyclical movements described with reference to the transfer rails 59 of the T–2 transfer unit. That is, the transfer rails 59 raise the workpiece W from the rest position at the end of the T–3 transfer unit, carry it down the line to the next station and lower it onto locators which receive and retain it in position for the next operation, which may be a piercing or buffing or any other compatible type of operation. The transfer rails 59 are returned to their starting position to await the signal to go through the cycle of movement once again to continue the movement of the workpieces or panels W along the automation line.

From the transfer unit T–5 the workpiece or panel W is positioned on a piercing unit, generally designated 121, which is an appendage of the last illustrated transfer unit T–6. In the illustrated automation organization, the transfer unit T–6 prepares the workpieces or panels W for transfer to a loading station preliminary to the further processing thereof. The transfer unit T–6 is provided with a turnover mechanism generally designated 122, adapted to invert the workpiece or panel W so that it is restored to the condition it was in when it was removed from the P–1 press, that is, with its concave side up.

A further understanding of the automation organization embodying the present invention may be obtained with reference to Figs. 11, 12, 13 and 14. These figures represent a schematic diagram of part of the electrical circuits utilized in controlling the automation organization. The wiring diagram is presented only in part since it will be readily apparent that each of the presses in an automation organization will have substantially similar control circuits. This applies also to most of the material handling or transfer units. The portions of the wiring diagram herein presented relates to the basic press and material handling units and to those other units having features in addition to those found in the basic units. The portions of the wiring diagram illustrated in Figs. 11, 12, 13 and 14 will be correlated with the respective units to which they pertain as the description proceeds.

The master push button station, generally designated 125, may be mounted in any convenient location, such as on the master control cabinet 87. Referring to Fig. 11, it will be noted, at the left end thereof, that the various push buttons on the push button panel 125 as well as in the section of the wiring diagram 126 are designated as PB–1, PB–2 and so on. As will be explained in greater detail, the several push buttons actuate control relays which open or close the desired circuits.

The functions of the several push buttons located at the master control station are as follows, starting at the top of the wiring diagram section 126 and working downwardly: PB–1 and PB–2 are the master start and master stop push buttons, respectively, controlling the energization and de-energization of the automation organization control circuit. Below PB–2 on diagram section 126 is shown a switch designated SS–1. This switch may be set to provide for manual or automatic operation of the automation organization. When the selector switch is positioned for so-called manual operation, each unit in the production line must be controlled by the actuation of push buttons at a push button station contiguous to the individual unit. On automatic position the selector switch interlocks the entire production line for cyclical operation through the master control system.

The actual starting and stopping of the cyclical operation is controlled through push buttons PB–4 and PB–5, respectively. Before the cyclical operation may be effected, however, it is necessary to actuate each of the push buttons which put into operation the electric motors driving the main hydraulic pumps of the various material handling or transfer units. These push buttons are labelled PB–6 to PB–13 inclusive. The several push buttons PB–6 to PB–13 are related to the units illustrated in Figs. 1 to 3, inclusive, as follows:

PB–6 puts into operation the motor driving the main hydraulic pump of the loading unit designated L in Fig. 1. PB–7 puts into operation the motor 62 driving the main hydraulic pump 64 of the transfer unit T–1 shown in Fig. 1. PB–8 similarly puts into operation motor 62 driving hydraulic pump 64 of transfer unit T–2, shown in Fig. 2. PB–9 and PB–10 control the pump motors of additional transfer units substantially identical to the transfer unit T–2. As was explained earlier, these additional units were not shown in order to avoid unnecessary duplication.

PB–11 controls motor 62 of transfer unit T–3 shown in Fig. 3. PB–12 controls the single pump motor 62 of transfer units T–4 and T–5. As has been explained, transfer units T–4 and T–5 are illustrated as linked for tandem operation and thus require only one pump motor 62 and hydraulic pump 64. PB–13 controls the pump motor for the last unit shown, transfer unit T–6.

One push button that has not been described is PB–3. This is a master emergency stop button which is effective upon actuation to immediately shut down the whole production line regardless of the cyclical status of any of the units.

Continuing with the general description of the wiring diagram, a second section, generally designated 127, is shown. In this section the leads 128 illustrate the power supply lines which preferably are the usual commercial or industrial installation, which supplies 440 volt, three phase, 60 cycle current. Suitable transformers 129 and 130 are provided to step down portions of the input current to 110 volts to energize two sub-circuits. Transformer 129 is connected on its secondary side to leads designated L–1 and L–2. Transformer 130 is connected on its secondary side to leads designated L–3, L–4 and L–5. The transformer circuits are protected by suitable fuses 131.

Before the description proceeds any further, it should be noted that the symbols used in the present wiring diagram are JIC (Joint Industrial Conference) standards. The small circles represent the control relay coils and are identified, by the letters CR (control relay) followed by a numeral, for example, CR–1. The parallel spaced lines which also bear the identification CR–1, for example, represent the contacts of the control relay having the CR–1 coil. It will be noted that the same coil may have multiple pairs of contacts related thereto. Parallel spaced lines such as CR–1 represent normally open contacts. A diagonal line through the parallel lines represents a normally closed contact.

In wiring diagram section 127 the following control relays with their one or more pairs of contacts are shown: MS–1, energized by the selector switch SS–1 when the latter is in manual position; CR–1 and CR–2, energized by PB–1 and PB–2, the master start and master stop push buttons, respectively; and CR–3, energized by the emergency stop push button PB–3. Other relay contacts, such as CR–122, CR–222 and so forth are shown. These relay contacts are part of the interlocking control network which ties the various units together. The control relay coils for these relay contacts will be found in other parts of the wiring diagram.

Immediately below the section of the wiring diagram 127 are shown symbols representing ground detection lights, the R in the circle indicating the color of the lights as being red.

The next three sections of the wiring diagram appearing in Fig. 11, which sections are generally designated 132, 133 and 134 relate to the circuits controlling the operation of the loading unit L, comprising the sheet separator 96 and sheet feeder 97. Section 132 and its continuation section 133, are the loading unit L control circuit and are tied into power lines L–2, L–3 and L–4, being energized from the secondary side of the transformer 130. Immediately above the section 132 is represented the hydraulic pump motor 135 of the loading unit L. Immediately above the section 133 is represented the push button station 136 utilized for operating the loading unit L independently of the master sequential operation, or, in other words, when SS–1 is set to manual operation.

Each of the push buttons shown at the push button station 136 has a counterpart in the wiring diagram sections 132 and 133. It will be understood that the several push buttons will actuate the same control relays that otherwise would be automatically actuated when the automation organization is on automatic operation. The identification of the function of each push button should thus make the function of the sub-circuit in which it is shown readily apparent.

PB–51 and PB–52 control the starting and stopping of the motor driving the hydraulic pump of the loading unit L. PB–53 is a unit stop button. PB–54 is a reset button, the function of which will be explained later. PB–55 and PB–56 control the up and down swinging movement, respectively, of the receiving table 102 of the sheet feeder 97. PB–57 and PB–58 control the raising and lowering of the magnets (not shown) mounted on the underside of the frame member 100. PB–59 and PB–60 control the movements of the frame member 104 toward and from the press being fed the sheet S. That is, actuation of PB–59 would result in the frame member 104 moving into the press P–1 to position the sheet over the press die. Actuation of PB–60 would cause the retraction of the frame member 104. PB–61 and PB–62, respectively, are actuatable to cause travelling movement of the frame member 100 which carries sheets from the sheet stack to the receiving table 102. PB–61 advances and PB–62 retracts the frame member.

A series of limit switches are indicated on the diagram. The limit switches, designated LS, are important both with respect to the manual and to the automatic operation of the loading unit L. They insure that an improper sequence of movements cannot occur. For example, LS–51 is a normally open limit switch which closes when the receiving member 102 is tilted upwardly to tilt the sheet S into contact with the magnets 106 on the frame member 104. The limit switch LS–52 is actuated when the sheet feeder receiving member 102 is tilted down. LS–53 is a normally open limit switch which is closed when the magnets on the underside of frame member 100 are lowered. LS–54 is a normally open limit switch which is closed when the loader is raised. LS–55 is a normally open limit switch which is closed when the feeder unit frame member 104 is into the press P–1. LS–56 is actuated when the feeder frame member 104 is withdrawn from the press. LS–57 is actuated when the travelling frame member 100 is advanced over the receiving table 102. LS–58 is actuated when the frame member 100 is retracted. LS–59 is normally open but closes when two sheets are moved by the travelling frame member 100 to the receiving table 102, a gage unit (not shown) being provided to measure the thickness of the sheets passing thereby.

The actual sequence of operations may best be followed with regard to the numerical sequence of the control relays. But before doing this, it should be noted that certain other relays are shown such as the manual relays M–50 and the motor relay MR–51. Also provided in the circuits are appropriate red and green lights indicating when certain components are in or out of neutral positions. To simplify the description, those relays, lights and so forth which are not directly concerned with the sequence of operations will not be described or further identified than by their identification symbols on the diagram.

In describing the operation of the loading unit L, it should be first explained that the 0 or start time in the sequence is taken as being that time when a sheet S is laying on the receiving table 102. The hydraulic motor has been started by actuation of PB–6 at the master control panel 125. CR–52 is the cycle start control relay and CR–53 is the pump load control relay. The latter CR–53 makes it unnecessary to stop the hydraulic pump motor when for some reason the cycling of the unit is interrupted. Should this occur, the output of the hydraulic pump is dumped into the reservoir, all pressure being taken off the various hydraulic units in the system. When conditions are normal for the re-start of the cycling of the unit, the by-pass valve is closed by energizing of its solenoid by CR–53 and the pump is again said to be loaded.

Starting at 0 time, the first control relay actuated is CR–54 which causes the receiving table 102 to be tilted up to position the sheet S beneath the frame member 104 magnets. LS–51 is closed when the sheet S is tilted up causing the frame member magnets to be energized through CR–55. The receiving table 102 is then lowered by actuation of CR–56, the sheet S being held by the frame member 104 magnets. Return of the receiving table 102 to its starting position actuates LS–52 causing CR–58 to actuate the lowering of the magnets on the underside of frame member 100.

CR–57 which is shown between CR–56 and CR–58 is a sequence control relay. At times the various components of any unit will reach conditions at which the relay controlling the load on the pump would be overruled causing the discharge pressure to be dumped. Control relays such as CR–57 are placed in the control circuit to ensure that this will not happen. Therefore CR–57 is said to sequence CR–53 to hold the circuit under loaded condition.

When the magnets on the underside have been lowered, LS–53 is actuated energizing CR–60 causing energization of the frame member 100 magnets. In the meanwhile CR–59 indicates that the receiving table has been completely tilted down. When the frame member 100 magnets are energized to secure a sheet S thereto, CR–61 is energized to cause the magnets to be raised. The completion of the upward movement causes LS–54 to close, CR–63 indicating the loader is up. On a time basis, the next movement to occur, through CR–62 circuit, is the movement of the feeder frame member 104 into press P–1. The completion of the loading movement of frame member 104 is signalled by limit switch LS–55. LS–55 is normally open and is closed when the frame member 104 is in the press. CR–64 and CR–65 are affected by LS–55, CR–64 sequencing the magnets carried by frame member 104 and CR–65 stopping the press loading movement at the proper moment to ensure proper positioning of the sheet S in the press P–1. After CR–64 causes the magnets to be de-energized to drop the sheet S, the frame member 104 is withdrawn from the press, control relay CR–66 controlling the withdrawal. Upon completion of the withdrawal LS–56 is actuated. Also, CR–67 causes demagnetization of the magnets on the frame member 104. The actuation of LS–56 times the advance of frame member 100 to carry a sheet to the receiving table 102. In the meanwhile CR–69 indicates the frame member 104 has returned to its initial starting position. The completion of the advance movement of frame member 100 is signalled by LS–57. CR–71 causes de-energization of the frame member 100 magnets causing the sheet S to be placed on the receiving table. Almost simultaneously with the de-energization of the magnets, CR–70 starts the return movement of the frame member 100. CR–72 demagnetizes the frame member 100 magnets.

Demagnetization of the magnets on the loading unit has for its purpose the neutralization of any residual magnetism effects and the prevention of the fouling of the magnets by metal particles and the like.

Completion of the return movement of frame member 100 is signalled by the limit switch LS–58. CR–73 sequences CR–63 and CR–65 to maintain them in proper condition so that the next cycle won't be interrupted. CR–74 indicates that frame member 104 has been returned.

CR–75 is the control relay affected by a signal from the gage unit that more than one sheet S is being carried by the frame member 100 to the receiving table 102. LS–59 which is normally opened closes when more than one sheet is transported. The cycling of the loading unit L is interrupted but all relays are held in the condition in which they are at the time of such interruption. When the excess sheet is removed, actuation of PB–54 will cause the interrupted cycling to be resumed.

The section of the wiring diagram of Fig. 11 generally designated 134 is energized through lines L–1 and L–5, the leads from the secondary side of transformer 129. The upper portion of the section 134 represents the circuits controlling the magnetization and demagnetization of the magnets carried by the press feeding frame member 104. As is shown the circuit contains a variable transformer 137 and a rectifier 138. The magnets are represented by circles 139. Control relay contacts CR–55 and CR–67 are shown which relate to the control relays CR–55 and CR–66 identified in the description of wiring diagram sections 132 and 133. It is believed sufficient to state that when the circuits including the rectifier 138 are energized, the magnets are effective to pick up a sheet S from the receiving table 102. To demagnetize the magnets, the variable transformer 137 circuit is energized sending direct current through the magnets.

The central portion of the wiring diagram section 134 illustrates the solenoids actuated by the several control relays. It will be recalled that units of the automation organization embodied in the present invention are preferably hydraulically motivated. The flow of fluid through the system to cause the desired movements of the mechanical structures is controlled through solenoid operated valves. The solenoids are indicated by a zigzag line. A brief run down of the solenoids shown is as follows: Solenoid 140 controls the by-pass valve 74 which determines whether pump 64 is supplying working fluid pressure or merely recirculating to the reservoir or tank 75. Solenoid 140 is controlled by CR–53. Solenoid 141, is also controlled by CR–53 and operates the lubrication system of unit. Solenoids 142 and 143 are controlled by control relays CR–54 and CR–56 respectively affecting the tilting up and tilting down of the receiving table 102. Solenoids 144 and 145 are controlled by CR–58 and CR–61 to respectively lower and raise the frame member 100 magnets. Solenoids 146 and 147 are controlled by CR–62 and CR–63 to respectively advance frame member 104 into the press P–1 and to retract the frame member 104 therefrom. Solenoids 148 and 149 are controlled by CR–68 and CR–70 to respectively cause travel of frame member 100 from the sheet stack to the receiving table 102 and to return the frame member 100 to its starting place.

The lower portion of wiring diagram section 137 is similar to the upper section of the diagram and illustrates the magnets 139, variable transformer 137 and rectifier 138 affecting the pick-up of sheets S from the sheet stack and subsequently causing them to be dropped on the receiving table.

Referring now to Fig. 12 and more particularly to the section of the wiring diagram generally designated 140, there is shown a portion of the control circuit related to press P–1. The section 140 of the wiring diagram relates only to the sequencing of the press lifters (not shown) which must be raised when the press is being loaded or unloaded and which must be lowered during the press operation. CR–109 which is tied in with loading unit L control circuit is the control unit which initiates the loading of the press P–1. The limit switch LS–108 is normally open when the press ram is down. But when the press ram is up LS–108 closes thereby closing a circuit through which the press loading sequence may be initiated. CR–110 indicates the position of the lifters in their down position. CR–117 signals that the lifters have been raised. The CR–117 circuit includes LS–111 which is normally opened when the press ram is in its up position. CR–118 is another sequencing relay in circuit with LS–109 which is a normally open press cam switch which closes at about 270° of press rotation. CR–119 is the control relay which initiates the up movement of the lifters, which up movement is initiated through the signal received from CR–118. CR–120 indicates that the press is open and is in circuit with LS–110 which is normally open press cam switch which is closed at the top position of the press ram. The foregoing is rather brief but it is believed that the function and relationship of the various relays and limit switches will become more apparent when tied in with the transfer unit circuits to be now described.

The next section of the wiring diagram, generally designated 141, pertains particularly to the transfer unit, designated T–1. The transfer unit T–1 starts from its neutral position, the position in which all the parts thereof are clear of the presses P–1 and P–2 on either side thereof. The carriage member 26 starts to the left in the direction of the P–1 press when CR–102 control relay initiates the cycle start. However, the transfer unit carriage member will not start to the left unless the following conditions are all met: (1) The press P–1 is open, indicated by normally open LS–110 being closed; (2) The press lifter is up, indicated by normally open LS–111 being closed; (3) The press sheet feeder, travelling frame member 104, is in a returned or retracted position, indicated by LS–56 being actuated; and (4) The turnover mechanism 107 is in its returned position as shown in Fig. 1, indicated by normally open LS–107 being closed when the turnover mechanism is in its returned position. If the foregoing conditions are met, the carriage member 26 will move to the left.

The carriage member 26 will move to the left a sufficient distance to position the left ends of the transfer rails under the workpiece to be unloaded from press P–1. The leftward movement of the carriage member 26 is controlled by CR–104 operating the solenoid 153 of valve 69. (See Fig. 12 wiring diagram section generally designated 152 for the diagrammatic representation of the solenoids.) The movement of the carriage member 26 terminates upon the limit switch LS–101 being actuated. This limit switch LS–101 sequences CR–104 holding the carriage member 26 in its press unloading position and at the same time energizes CR–106 causing the solenoid 154 to open valve 70 and causing the transfer rails 59 to be raised. The raising of the transfer rails actuates limit switch LS–102 causing the P–1 press lifters to lower. The lowering of the lifters actuates limit switch LS–103. Actuation of LS–108 causes solenoid 155 of solenoid valve 69 to direct fluid under pressure to hydraulic motor 36 so as to cause the carriage 26 to move toward the right.

After the carriage 26 has moved approximately one-third of the distance toward press P–2, limit switch LS–105B is actuated. Actuation of this switch is a safety means. The function of this switch is to check and see whether (1) The limit switch LS–201 (Fig. 13 wiring diagram section generally designated 160) is released, that is whether or not transfer unit T–2 is clear of press P–2; (2) The limit switch LS–206 (see Fig. 12 wiring diagram section generally designated 159) indicating that press P–2 lifter is down has been actuated; (3) The limit switch LS–202 on transfer unit T–2 is actuated; and (4) The limit switch LS–209 is actuated indicating that press P–2 is at the top of its stroke. Until all these signals are received, the transfer unit T–1 carriage member 26 will remain stopped in its travel toward press P–2. Upon the proper signals being received the carriage member will move toward press P–2 to load the latter, the movement continuing until LS–103 is actuated causing carriage movement to cease. Actuation of LS–103 causes the press P–2 lifters to come up. When the press P–2 lifters raise, limit switch LS–207 is actuated causing solenoid 156 to direct hydraulic valve 70 to motivate the lowering of the transfer rails 59. The lowering of the transfer rails actuates limit switch LS–104 causing control relay 115 to be energized and energizing the circuit causing movement of the carriage member 26 toward the left to its original or neutral position.

The return of the carriage member 26 to its neutral position actuates LS–105A stopping the further movement of the carriage member. It will be understood that the workpiece removed from press P–1 has been deposited at an idle station when the transfer rails lowered to load a preceding workpiece in press P–2. The actuation of LS–105A not only stops movement of the carriage member but energizes the turnover mechanism 107 magnets. LS–105A also causes CR–124 to be energized thereby energizing solenoid 157 to cause solenoid valve 71 to motivate the turnover mechanism to swing the workpiece through a 180° arc. LS–105A has the further function of causing P–2 lifters to lower causing the press to start.

When the turnover mechanism 107 is in a workpiece inverted position LS–106 is actuated shutting off the direct current to the turnover magnets 113 and causing the application to the magnets of alternating current through a variable transformer 137. Also, LS–106 initiates through CR–127 and valve 71 solenoid the return movement of the empty turnover unit.

Upon its return the turnover unit 107 actuates LS–107, that is, causes the switch to close which, it was stated above, was one of the conditions which had to be met to originally initiate the transfer cycle.

The section of the wiring diagram generally designated 160 in Fig. 13 relates to the transfer unit T–2. This section of the wiring diagram is similar in many respects to the wiring diagram of transfer unit T–1 hereinbefore described. Transfer unit T–1 has the turnover mechanism 107 thereon. However, since transfer unit T–2 was described as the basic unit, it is believed desirable to go through the actuation of the T–2 transfer unit in terms of its wiring diagram.

CR–202 is the control relay which initiates the cycle to start the T–2 carriage member 26 toward press P–2 if the press is ready to be unloaded, that is, the press is open and the press lifter is up, these two conditions being signalled by the actuation of LS–209 and LS–207, respectively. If the press is ready to be unloaded, CR–204 is energized causing solenoid 161 of solenoid valve 69 to be energized to cause the valve to supply fluid under pressure to the hydraulic motor 36 driving the lead screw 32. Upon the carriage member 26 reaching the P–2 unload position it actuates LS–201 which causes CR–205 to sequence CR–204 and to stop further movement of the carriage 26. LS–201 also causes CR–206 to be energized to energize solenoid 162 of solenoid valve 70 causing the motivation of the lift movement of the transfer rails 59. Upon the transfer rails 59 being raised, LS–202 is actuated causing press P–2 lifter to lower. The lowered press lifter actuates LS–206 causing CR–209 to energize solenoid 163 of valve 69 causing fluid flow to hydraulic motor 36 in such a manner as to reverse the direction of rotation of the lead screw 32 so as to cause the carriage member 26 to move toward press P–3.

Upon carriage member 26 moving approximately one-third of the advance toward press P–3, limit switch LS–205–B is actuated. This is a check to see if the next transfer unit T–3 is in neutral and if the P–3 press lifter is down, the transfer unit T–3 transfer rails 59 are raised and the press P–3 is at its top position. Carriage member 26 of the T–2 transfer unit will remain stopped or in neutral position until the proper signals are received. Upon the carriage member 26 continuing its movement toward press P–3, limit switch LS–203 is actuated causing the stopping of the transfer movement and causing the press P–3 lifter to come up to receive a workpiece. The elevated lifter actuates LS–307 which energizes solenoid 164 of valve 70 causing the lowering of the transfer rails 59. The lowered transfer rails 59 actuate LS–204 energizing CR–215 which results in CR–204 being energized to cause movement of the carriage member 26 toward the left toward its neutral position. Upon carriage member 26 returning to its neutral position, limit switch LS–205–A is actuated stopping movement of the carriage member 26. Completion of the carriage member 26 movement is signalled to press P–3 through LS–205–A permitting the sequence of press actions to commence.

The foregoing are the basic control relays and limit switches concerned in the operation of the transfer unit T–2. However, as can be seen from the sections 161 of the wiring diagram a large number of control relay coils and contacts are involved in the automation organization. To trace each circuit would involve a very lengthy description. However, it is believed that the relationship of the various relays and contacts is sufficiently self-explanatory from the wiring diagram to make it unnecessary to describe in detail each inter-locking circuit between the various press units and transfer units.

Referring now to Fig. 13 and the sections of the wiring diagram generally designated 165, these sections, the right section 165 being a longitudinal continuation of the left section 165, relate to the transfer units generally designated T–4 and T–5. As was described earlier, transfer units T–4 and T–5 are a tandem unit and as such are adapted to carry the workpiece or hood panel from station to station for the performance of desired piercing and buffing operations. As far as the control circuits controlling the transfer movements are concerned reference may be had to the description of the T–1 and T–2 transfer unit wiring diagrams. Of interest in wiring diagram sections 165 is the inter-relationship of the transfer movements and the movements of the piercing unit 119.

CR–612 indicates that the transfer rails 59 are in a lowered position, said transfer rails when so lowered actuating limit switch LS–605. CR–612 being energized results in solenoid valve 166, indicated on Fig. 14 wiring diagram section 167, being energized to cause the pierce unit 119 to rise. It should be noted here that the solenoid valves are located on transfer unit T–4 for convenience (the valves not being shown other than by designation of the solenoids in section 167 of the wiring diagram).

The raised pierce unit 119 actuates LS–606 causing the circuit including CR–614 and the solenoid 168 representing the solenoid valve to be energized whereby the hydraulic piercing unit is motivated and the part pierced.

At the end of the pierce stroke, LS–607 is actuated causing the circuit 615 including solenoid 169 to be energized whereby the piercing unit is returned or retracted. The returned pierce unit actuates LS–608 energizing the circuit including CR–616 and solenoid 170 whereby the piercing unit 119 is lowered. The lowered piercing unit 119 actuates limit switch LS–609 indicating that the piercing unit 119 is out of the way and that the workpiece may be carried along to the next operation.

The last portion of the general wiring diagram of the automation organization embodying the present invention selected to be shown is the section on Fig. 14 generally designated 168. This section 168 is of interest since it relates to transfer unit T–6 which has piercing unit 121 appended to the front end thereof and which includes a turnover mechanism generally designated 122.

When the transfer rails 59 of transfer unit T–4 lower to deposit a workpiece or panel partially within the retaining elements of piercing unit 121, limit switch LS–605 is actuated. This results in CR–704, shown in wiring diagram section 166, energizing the solenoid 173 controlling the solenoid valve which is effective to motivate the piercing unit 121 to pierce the workpiece or panel. The piercing stroke actuates LS–701 energizing the piercing unit return control circuit comprising CR–705 and valve solenoid 174. The return of the piercing unit actuates LS–702 causing the turnover mechanism 122 to swing from the position shown in Fig. 3 to a position overlying the workpiece or panel at the piercing station. LS–702 energizes the circuit containing CR–706 and valve solenoid 175.

When the turnover mechanism is in position to pick up the workpiece or panel it actuates LS–703 energizing the circuit comprising CR–708 causing magnets 181 to be energized thereby picking up the workpiece or panel. LS–703 when actuated simultaneously energizes the circuit containing CR–707 and valve solenoid 176 causing the turnover mechanism 122 to be hydraulically motivated to swing the workpiece or panel to an inverted position. Completion of the inverted movement is signalled by actuation of limit switch LS–704 which is effective to de-energize the magnets and is also effective to cause the transfer rails 59 to rise, CR–709 and valve solenoid 177 having been energized by the actuation of LS–704. The raising of the transfer rails 59 actuates limit switch LS–705, energizing the circuit comprising CR–711 and valve solenoid 178 causing carriage member 26 to be moved to the right as viewed in Fig. 3. Movement of the carriage member 26 to the right a pre-determined distance results in actuation of LS–706 stopping the carriage movement and energizing CR–712 and valve solenoid 179 to cause lowering movement of the transfer rails 59. Completion of the lowering movement is signalled by actuation of LS–707 stopping the lowering movement and energizing CR–713 and valve solenoid 180 to cause movement of the carriage member 26 to the left to its original position. Completion of the carriage movement to the left is signalled by actuation of LS–708 which stops such movement. The carriage member 26 is thus ready to begin its cycle again upon the proper signal from the turnover mechanism 122 that another workpiece or panel is ready to be moved from the turnover mechanism to the last sttaion on the transfer unit T–6.

It will be understood that Figs. 11 to 14 inclusive represent only a portion of the complex control circuits of the press automation organization embodying the present invention. But it is believed that the portion herein presented will be sufficient for an understanding of the manner in which the circuits of the various units are interlocked. The description in the main was written in terms of automatic operation. But by noting the identifying symbols adjacent the various push buttons shown on the push button panels located above their related sections of the wiring diagram as well as in the wiring diagram sections themselves and tracing the control relay coil in circuit with the several push buttons, the function of the push buttons when used for manual operation will be apparent.

To illustrate, with reference to piercing unit 121 and transfer unit T–6 in Fig. 3 and their corresponding wire diagram section 171 in Fig. 14, PB–701 is the push button for starting the main hydraulic pump motor. PB–702 is the hydraulic motor stop button. PB–703 is the push button for stopping the whole unit, that is, de-energizing all control relays. PB–704 is the reset button. PB–705 manually control the piercing movement of the pierce unit 122 and PB–706 controls the return of the pierce unit, actions which were automatically controlled through limit switches closing circuits through control relays CR–704 and CR–705 respectively. It will be noted, for example, that alternate circuits for energizing CR–705 exist, one circuit including LS–701 and the other circuit including PB–706. Therefore, the closing of either switch will energize the same control relay.

PB–707 may be actuated to swing the empty turnover mechanism to a loading position. PB–708 may be actuated to energize the pick up magnets 181 and to swing the turnover mechanism 122 to invert the workpiece thereon. PB–709 then may be actuated to cause transfer rails 59 to be raised and to simultaneously de-energize magnets 181 to permit the transfer rails to lift the panel therefrom. PB–710 would next be actuated to move the carriage member 26 to the right. PB–711 actuation would cause the transfer rails to lower, and PB–712 would be the final push button that could be actuated to cause the carriage member to return to its starting position.

I claim:

1. Transfer mechanism for moving a workpiece from a first work station to a second work station comprising a base structure, carriage means movably mounted on said base structure, a first power means effective to move said carriage means relative to said base structure in reciprocal directions, workpiece supporting elements, means comprising a straight line motion linkage system mounting said elements on said carriage means for raising and lowering movements relative thereto, a second power means for moving said elements, and control means sequentially controlling the actuation of said first and second power means whereby said work supporting elements through the movements of said carriage means and the raising and lowering movements of the elements are cyclically moved through a series of positioning, lifting, carrying and placement movements to transfer successive workpieces from one work station to the next.

2. Transfer mechanism for moving a workpiece from a first work station to a second work station comprising a base structure, carriage means movably mounted on said base structure, a first power means effective to move said carriage means in directions toward and from said first and second work stations, workpiece supporting elements, means comprising a straight line motion linkage system mounting said elements on said carriage means for raising and lowering movements relative thereto, a second power means for actuating said linkage system to move said elements, and control means sequentially controlling the actuation of said first and second power actuated means, said control means being effective to sequentially actuate said first power and second power means to move said carriage means and support elements into workpiece pick-up position, workpiece lifting movement, workpiece carrying movement, workpiece placement movement, and carriage means and support element retraction movement.

3. Transfer mechanism for moving a workpiece from a first work station to a second work station comprising a base structure, carriage means movably mounted on said base structure, a first power means interposed between said base structure and carriage means effective to move the latter in directions toward and from said first and second work stations, workpiece supporting elements, means comprising a straight line motion linkage system mounting said elements on said carriage means for raising and lowering movements relative thereto, a second power means interposed between said carriage means and said linkage system for actuating the latter to move said elements, and control means sequentially controlling the actuation of said first and second power actuated means, said control means being effective to sequentially actuate said first power and second power means to move said carriage means and support elements into workpiece pick-up position, workpiece lifting movement, workpiece carrying movement, workpiece placement movement and carriage means and support element retraction movement.

4. Transfer mechanism for moving a workpiece from a first work station to a second work station comprising a base structure, carriage means movably mounted on said base structure, a first power means effective to move said carriage means in directions toward and from said work stations, workpiece supporting means comprising rail members, means comprising a straight line motion linkage system mounting said rail members on said carriage means for raising and lowering movements thereon, a second power means for operating said linkage system to raise and lower said rail members, and means sequentially controlling the actuation of said first and second power means whereby said rail members are cyclically positioned relative to a workpiece in said first work station, raised to lift the workpiece from said first station, transported with the workpiece, lowered in placement of the workpiece and retracted.

5. Transfer mechanism for moving a workpiece from a first work station to a second work station comprising a base structure, means carried by said base structure providing at least one idle station to receive said workpiece while in transit between said work stations, carriage means movably mounted on said base structure, a first power means effective to move said carriage means in directions toward and from said work stations, workpiece supporting means comprising rail members, means comprising a straight line motion linkage system mounting said rail members on said carriage means for raising and lowering movements thereon, said rail members extending over the opposite ends of the carriage means so as to project beyond the respective ends of the base structure when said carriage means is at one or the other end thereof, a second power means for operating said linkage system to raise and lower said rail members and means sequentially controlling the actuation of said first and second power means whereby one end of said rail members are cyclically positioned relative to a workpiece in said first work station, raised to lift the workpiece from said first station, transported with the workpiece and lowered in placement of the workpiece at said idle station and retracted.

6. Transfer mechanism for moving a workpiece from a first work station to a second work station comprising a base structure, means carried by said base structure providing at least one idle station to receive said workpiece while in transit between said work stations, carriage means movably mounted on said base structure, a first power means effective to move said carriage means in directions toward and from said work stations, workpiece supporting means comprising rail members, means comprising a straight line motion linkage system mounting said rail members on said carriage means for raising and lowering movements thereon, said rail members extending over the opposite ends of the carriage means so as to project beyond the respective ends of the base structure when said carriage means is at one or the other end thereof, a second power means for operating said linkage system to raise and lower said rail members and means sequentially controlling the actuation of said first and second power means whereby one end of said rail members are cyclically positioned relative to a workpiece in said first work station, raised to lift the workpiece from said first station, transported with the workpiece and lowered in placement of the workpiece at said idle station and retracted, said workpiece being subsequently picked up from an idle station by the other end of said rail members on the next cyclical movement thereof for placement at said second work station.

7. Transfer mechanism for moving a workpiece from a first work station to a second work station comprising a base structure, means carried by said base structure providing at least one idle station to receive said workpiece while in transit between said work stations, carriage means movably mounted on said base structure, a first power means effective to move said carriage means in directions toward and from said work stations, workpiece supporting means comprising rail members, means comprising a straight line motion linkage system mounting said rail members on said carriage means for raising and lowering movements thereon, said rail members extending over the opposite ends of the carriage means so as to project beyond the respective ends of the base structure when said carriage means is at one or the other end thereof, a second power means for operating said linkage system to raise and lower said rail members and means sequentially controlling the actuation of said first and second power means whereby one end of said rail members are cyclically positioned relative to a workpiece in said first work station, raised to lift the workpiece from said first station, transported with the workpiece and lowered in placement of the workpiece at said idle station and retracted, one of said idle stations being provided with a turnover mechanism adapted to invert the workpiece, said base structure being provided with locating means to receive the inverted workpiece, said workpiece being subsequently picked up from said locating means by said rail members on the next cyclical movement thereof for further advancement toward said second work station.

8. Transfer mechanism for moving a workpiece along successive work stations comprising a base structure, carriage means movably mounted on said base structure, a first power means effective to reciprocate said carriage means relative to said work stations, workpiece supporting means comprising rail members, means comprising a straight line motion linkage system mounting said rail members on said carriage means for raising and lowering movements thereon, the respective ends of said rail members extending over the opposite ends of the carriage means so as to project beyond the respective ends of the base structure when said carriage means is at one or the other end thereof, a second power operated means for operating said linkage system to raise and lower said rail members, locating means located on said base structure providing at least one idle station to receive said workpiece while in transit over said transfer unit, and means sequentially controlling the actuation of said first and second power means whereby a workpiece is lifted and carried by one portion of said rail members from one work station to an idle station, and then subsequentially lifted and carried by a second portion of said rail members toward another station as said one portion of the rail members lifts and carries a second workpiece toward said idle station.

9. Transfer mechanism for moving a workpiece along successive work stations comprising a base structure, carriage means movably mounted on said base structure, a first power means effective to reciprocate said carriage means relative to said work stations, workpiece supporting means comprising rail members, means comprising a straight line motion linkage system mounting said rail members on said carriage means for raising and lowering movements thereon, the respective ends of said rail members extending over the opposite ends of the carriage means so as to project beyond the respective ends of the base structure when said carriage means is at one or the other end thereof, a second power operated means for operating said linkage system to raise and lower said rail members, locating means located on said base structure providing at least one idle station to receive said workpiece while in transit over said transfer unit, and means sequentially controlling the actuation of said first and second power means whereby a workpiece is lifted and carried by one portion of said rail members from one work station to an idle station, and then subsequentially lifted and carried by a second portion of said rail members toward another station as said one portion of the rail members lifts and carries a second workpiece toward said idle station, turnover means being provided at said idle station to invert the workpiece prior to further advancement over the transfer mechanism by said second portion of the rail members.

10. An automation metal working organization having, in combination, at least two work stations adapted to perform consecutive operations on a workpiece, transfer mechanism interposed between work stations, each transfer mechanism comprising power actuated work supporting means effective to move said workpiece through a series of positioning, lifting, carrying and placement movements whereby the same is transferred from one work station to the next work station, and an electric control system for controlling the cyclical movement of the work supporting means, said control system comprising a series of control relays some of which are responsive to the actuation of limit switches related to said work stations, the latter being required to be in pre-determined open or closed positions before transfer movement can occur.

11. An automation metal working organization having, in combination, at least two work stations adapted to perform consecutive operations on a workpiece, transfer mechanism interposed between work stations, each transfer mechanism comprising power actuated work supporting means effective to move said workpiece through a series of positioning, lifting, carrying and placement movements whereby the same is transferred from one work station to the next work station, and an electric control system for controlling the cyclical movement of the transfer mechanism, said control system comprising a series of control relays some of which are responsive to the actuation of limit switches located at each work station, the latter being required to be in pre-determined open or closed positions before transfer movement can occur, and a transfer mechanism mounted switch means effective to suspend transfer movement after the removal of a workpiece from one station until the next station limit switches indicate said next station is ready to receive the workpiece.

12. An automation metal working organization having, in combination, at least two work stations adapted to perform consecutive operations on a workpiece, transfer mechanism interposed between work stations, each transfer mechanism comprising a base structure, carriage means movably mounted on said base structure, a first power operated means effective to selectively move said carriage means in alternate horizontal directions, work supporting means carried on said carriage means, a second power operated means effective to move said work supporting means relative to said carriage means at right angles thereto in alternate directions, and an electric control system sequentially controlling the actuation of said first and second power operated means whereby said work supporting means through the movements of said carriage means and through its movements independently of said carriage means are cyclically moved through a series of positioning, lifting, carrying and placement movements to transfer workpieces from one station to the next, said control system comprising a series of control relays some of which are responsive to switches located at the respective work stations, the latter being required to be in pre-determined open or closed position before the transfer movement can occur, and means including a transfer mechanism mounted switch effective to suspend movement of the carriage means during its travel from one work station to the next until said next station limit switches indicate said next station is ready to receive the workpiece.

13. An automation metal working organization having, in combination, at least two work stations adapted to perform consecutive operations on a workpiece, transfer mechanism interposed between work stations, each transfer mechanism comprising a base structure carriage means movably mounted on said base structure, a first hydraulically operated power means effective to selectively move said carriage means in alternate horizontal directions, work supporting means carried on said carriage means, a second hydraulic power means effective to move said work supporting means relative to said carriage means at right angles thereto in alternate directions, a solenoid controlled valve system for directing hydraulic fluid to motivate said first and second power operated means, and an electric control system sequentially energizing the solenoids of said valve system whereby said work supporting means through the movements of said carriage means and through its movements independently of said carriage means are cyclically moved through a series of positioning, lifting, carrying and placement movements to transfer workpieces from one station to the next, said control system comprising a series of control relays actuated through switches located at the transfer mechanism and at the respective work stations, the latter being required to be in pre-determined open or closed position before the transfer movement can occur.

14. An automation metal working organization having in combination, at least two work stations adapted to perform consecutive operations on a workpiece, transfer mechanism interposed between work stations, each transfer mechanism comprising a base structure, carriage means movably mounted on said base structure, a first hydraulically operated power means effective to selectively move said carriage means in alternate horizontal directions, work supporting means carried on said carriage means, a second hydraulic power means effective to move said work supporting means relative to said carriage means at right angles thereto in alternate directions, a solenoid controlled valve system for directing hydraulic fluid to motivate said first and second power operated means, and an electric control system sequentially energizing the solenoids of said valve system whereby said work supporting means through the movements of said carriage means and through its movements independently of said carriage means are cyclically moved through a series of positioning, lifting, carrying and placement movements to transfer workpiece from one station to the next, said control system comprising a series of control relays actuated through switches located at the transfer mechanism and at the respective work stations, the latter being required to be in pre-determined open or closed position before the transfer movement can occur, and means including a transfer mechanism mounted switch means effective to suspend movement of the carriage means during its travel from one work station to the next until said next station switches indicate through energization or de-energization of the proper relays that said next station is ready to receive the workpiece.

15. An automation material working organization having in combination, at least two work piece detaining stations at which material working operations may be performed, and a transfer mechanism unit intermediate said stations, said transfer mechanism unit comprising a base structure, work supporting elements, mounting means supporting said work supporting elements from below in spaced relation to and above said base structure, and power actuated means effective to move said mounting means and thereby said work supporting elements cyclically so as to position a section of the latter beneath a workpiece at a station, to lift said workpiece from said station, to transport said workpiece above said transfer mechanism, to lower said workpiece at the next station, and to retract said section from beneath said workpiece.

16. An automation material working organization having, in combination, at least two workpiece detaining stations at which material working operations may be performed, and a transfer mechanism unit comprising a base structure, work supporting elements, mounting means supporting said work supporting elements from below in spaced relation to and above said base structure, power actuated means effective to move said mounting means and thereby said work supporting elements cyclically so as to position a section of the latter beneath a workpiece at a station, to lift said workpiece from said station, to transport said workpiece above said transfer mechanism, to lower said workpiece at the next station, and to retract said section from beneath said workpiece, and control means selectively operative to effect repetition of said cyclical movements whereby successive workpieces are transferred from station to station.

17. An automation material working organization having, in combination, at least two workpiece detaining stations at which material working operations may be performed, and a transfer mechanism unit intermediate said stations, said transfer mechanism unit comprising a base structure, carriage means movably mounted on said base structure, a first power operated means effective to selectively move said carriage means in alternate directions, work supporting means, means supporting said work supporting means from below on said carriage means in spaced relation to and above said base structure, a second power operated means effective to move said work supporting elements independently of said carriage means in alternate directions of movement at right angles to the directions of movement of said carriage means, and means sequentially controlling the actuation of said first and second power operated means whereby said work supporting elements through the movements of said carriage means and the movements of said elements independently of said carriage means are cyclically moved so as to position a section thereof beneath a workpiece at a station, to lift said workpiece from said station, to transport said workpiece above said transfer mechanism, to lower said workpiece at the next station, and to retract said section from beneath said workpiece.

18. An automation material working organization having, in combination, at least two workpiece detaining stations at which material working operations may be performed, and a transfer mechanism unit intermediate said stations, said transfer mechanism unit comprising a base structure, carriage means movably mounted on said base structure, a first power operated means effective to selectively move said carriage means in alternate horizontal directions, work supporting means, means supporting said work supporting means from below on said carriage means in spaced relation to and above said base structure, a second power operated means effective to move said work supporting elements independently of said carriage means in alternate directions of movement at right angles to the directions of movement of said carriage means, and means sequentially controlling the actuation of said first and second power operated means, whereby said work supporting elements through the movements of said carriage means and the movements of said elements independently of said carriage means are cyclically moved so as to position a section thereof beneath a workpiece at a station, to vertically lift said workpiece from said station, to horizontally transport said workpiece above said transfer mechanism, to vertically lower said workpiece above said transfer mechanism, to vertically lower said workpiece at the next station, and to horizontally retract said section from beneath said workpiece.

References Cited in the file of this patent

UNITED STATES PATENTS

| 2,638,662 | Rothwell | May 19, 1953 |
| 2,723,022 | Van Schie | Nov. 8, 1955 |